United States Patent
Dev et al.

(10) Patent No.: US 11,006,649 B2
(45) Date of Patent: May 18, 2021

(54) NON-LINEAR SLOTTED WAVEGUIDE FOR DIVERSE APPLICATION

(71) Applicant: Florida A&M University, Tallahassee, FL (US)

(72) Inventors: Satyanarayan Dev, Tallahassee, FL (US); Vijaya Grama Seetharamiengar Raghavan, Pincourt (CA); Yvan Gariepy, Quebec (CA); Valerie Orsat, Beaconsfield (CA)

(73) Assignee: Florida A&M University, Tallahassee, FL (US)

( * ) Notice: Subject to any disclaimer, the term of this patent is extended or adjusted under 35 U.S.C. 154(b) by 363 days.

(21) Appl. No.: 16/176,910

(22) Filed: Oct. 31, 2018

(65) Prior Publication Data

US 2020/0128837 A1    Apr. 30, 2020

(51) Int. Cl.
| | | |
|---|---|---|
| *A23B 5/005* | (2006.01) | |
| *A23L 3/01* | (2006.01) | |
| *A23L 15/00* | (2016.01) | |
| *A23B 5/01* | (2006.01) | |

(52) U.S. Cl.
CPC .............. *A23B 5/0052* (2013.01); *A23B 5/01* (2013.01); *A23L 3/01* (2013.01); *A23L 15/20* (2016.08)

(58) Field of Classification Search
CPC . A23B 5/0052; A23B 5/01; A23L 3/01; A23L 15/20
USPC ................................. 219/702, 729, 732, 752
See application file for complete search history.

(56) References Cited

U.S. PATENT DOCUMENTS

| | | | | |
|---|---|---|---|---|
| 5,545,881 A | * | 8/1996 | Chai | H05B 6/6447 219/719 |
| 6,546,646 B1 | * | 4/2003 | Thomas | F26B 21/06 34/412 |
| 2014/0262010 A1 | * | 9/2014 | Heineck | B29C 66/81263 156/275.5 |
| 2018/0270916 A1 | * | 9/2018 | Kimrey, Jr. | H05B 6/707 |
| 2020/0000128 A1 | * | 1/2020 | Rossouw | H05B 6/782 |

FOREIGN PATENT DOCUMENTS

WO    WO-2018154422 A1 * 8/2018 ............... A23L 5/34

OTHER PUBLICATIONS

Hank, C. R. et al., The Effect of Shell Egg Pasteurization on the Protein Quality of Albumen, Poultry Science. 2001, 80:821-824.
(Continued)

*Primary Examiner* — Thien S Tran
(74) *Attorney, Agent, or Firm* — Steven M. Forte; Smith & Hopen, P.A.

(57) ABSTRACT

Structures and methods of using a microwave pasteurization device, as well as related non-linear waveguides. In some embodiments, an in-shell egg pasteurization device with a non-linear slotted waveguide. In some embodiments the non-linear slotted waveguide comprises shaped waveguide applicators. The shaped waveguide applicators may employ oval, lens, or plum shaped non-linear slots to improve efficiency and efficacy of pasteurizing in-shell eggs, live oysters, tomatoes, or blueberries while maintianly the quality and functional attributes of the raw product.

16 Claims, 9 Drawing Sheets

(56) References Cited

OTHER PUBLICATIONS

Yakovlev, V. V. Improving Quality of Microwave Heating by Packaging—Analytical Approach, In 2001 ASAE Annual International Meeting Sacramento, California, USA: ASAE.

Dev, S. R. S. et al., Optimization of Radio Frequency Heating of In-Shell Eggs Through Finite Element Modeling and Experimental Trails, Progress In Electromagnetics Research B, 2012, vol. 45, 203-222.

Geveke, D. J. et al., Pasteurization of shell eggs using radio frequency heating, Journal of Food Engineering, 193 (2017) 53-57.

Dev, S. R. S. et al., Quality Assessment of Microwave Pasteurized In-Shell Eggs, International Congress on Food Engineering and Technology (IFET2012), Mar. 26-28, 2012.

Dev, S. R. S. et al., Dielectric properties of egg components and microwave heating for in-shell pasteurization of eggs, Journal of Food Engineering 86 (2008) 207-214.

Dev, S. R. S., Microwave Pasteurization of Shell Eggs—A Comprehensive Study, a thesis submitted to McGill University, Department of Bioresource Engineering Faculty of Agricultural & Environmental Sciences McGill University, Jun. 2010.

Dev, S. R. S. et al., Finite element modeling for optimization of microwave heating of in-shell eggs and experimental validation, Int. J. Numer. Model. 2012; 25:275-287. Published online Sep. 26, 2011 in Wiley Online Library (wileyonlinelibrary.com).

Kamotani, S., Consumer Acceptance of Ozone-Treated Whole Shell Eggs, a thesis submitted in the Graduate School of The Ohio State University, 2009.

Stadelman, W. J. et al., Pasteurization of Eggs in the Shell, Poultry Science, 1996, 75:1122-1125.

Hoffert, S., Pasteurizing Eggs in the Shell: Researchers Take Strides Against *Salmonella*, The Scientist Magazine, Jul. 20, 1998.

Lakins, D. G. et al., Processing, Products, and Food Safety, Reduction of *Salmonella* Enteritidis in Shell Eggs Using Directional Microwave Technology, Poultry Science, 2008, 87:985-991.

Dev, S. R. S. et al., FDTD Modeling and Simulation of Microwave Heating of In-Shell Eggs, Progress In Electromagnetics Research M, 2010, vol. 13, 229-243.

Annex G—Pasteurization of Liquid Egg Products and Shell Eggs, USDA Food Safety and Inspection Service, https://www.fsis.usda.gov/wps/wcm/connect/96aedc4e-c0d5-4a0a-9b59-a9f6440fd214/SE_Risk_Assess_Annex_G_Oct2005.pdf?MOD=AJPERES, accessed May 30, 2019.

Dev, S. R. S. et al., Selected Post-Heating Properties of Microwave or Hot Water Heated Egg White for In-Shell Pasteurization, International Journal of Food Properties, 2010, 13:4, 778-788.

\* cited by examiner

NON-LINEAR SLOTTED WAVEGUIDE FOR DIVERSE APPLICATION

TECHNICAL FIELD

Embodiments of this disclosure relate, generally, to non-linear slotted waveguide microwave pasteurization. More specifically, embodiments of the disclosure relate to oval slotted waveguide microwave pasteurization of in-shell eggs. In alternative embodiments of the disclosure relates to shaped slotted waveguide microwave pasteurization of live oysters as well as a plum shaped slotted waveguide for heat treatment of tomatoes and berries, leading to both pasteurization and quality enhancements in the fruits.

BACKGROUND

Pasteurization is a heat treatment that has been used extensively to inactivate food-borne pathogens. Unlike sterilization, pasteurization is not intended to kill all the microorganisms in the food or liquid. Instead, pasteurization aims to destroy/inactivate all the viable pathogens, so they are unlikely to cause disease (assuming that the pasteurized product is refrigerated and consumed before its expiration date). Also, commercial-scale sterilization of food is not common because it adversely affects the taste and quality of the product. It has been used successfully with liquid eggs but its utilization for in-shell eggs has been quite a challenge due to the geometry of the shell egg and the heat sensitivity of the egg proteins.

Pasteurization is defined as "a process of heating food for the purpose of killing harmful organisms such as bacteria, viruses, protozoa, molds, and yeasts." (Lewis and Heppell 2000). The process was named after its inventor, French scientist Louis Pasteur.

Pasteurization does not completely kill or eliminate all the microorganisms present in the food. It is described as a mild process because the amount of chemical damage caused is small and the changes to the food's sensory characteristics are minimal. It aims to achieve a certain number of "log reductions" in the number of viable organisms, thus rendering the microorganisms ineffective due to the fact that their numbers will be well below the infectious dose within the stipulates storage period using specified storage conditions.

Microwave ("MW") energy can be used to raise the temperature of food material of interest to the required pasteurization temperature in minutes. Moreover, MW have been shown to enhance the thermal destruction of microbes (Tajchakavit 1997). MW are not ionizing radiation, but the dielectric properties of the microorganism itself, enhances heat generation within it, leading to its destruction in a microwave environment. Microwaves have the ability to generate heat from within a substance that is exposed to it. Microwave ("MW") heating is favored for its quick heating and good penetration capacity, such that it is suitable for High Temperature Short Time (HTST) treatments (Ohlsson, 2000). Non-thermal denaturation with MW could occur due to ionization, but the effect is very minimal and highly reversible (Bohr & Bohr, 2000). Very little work has been done on making microwave pasteurization viable for industrial use and there is very limited literature available.

Eggs are a popular ingredient in many foods and widely used in the food industry. Eggs are among the major foods of animal origin generally marketed and frequently consumed raw. More than 90% of food-borne Salmonellosis, caused by *S. enteritidis*, occurs through shell eggs (Schroeder et al. 2005; Woodward, Khakhria, and Johnson 1997).

The egg is one of nature's marvels, designed to provide self-sustainability and excellent defense mechanisms to bring a fertilized cell to life as a chick. It is exquisitely simple, yet enormously complex. The eggs have remained a focus of research and development of food products for centuries. It has enthused several scientists and researchers in terms of its incredible functionality and functional properties, both as an individual entity and as an ingredient in several foods.

Due to their rich nutritive value, eggs are potential hosts and carriers of pathogenic microbes like *Salmonella enteritidis*. Heat pasteurization is the best solution for controlling these pathogens but affects the egg's vital functional properties due to protein denaturation.

Common contaminants found in food items, such as eggs, are micrococci, molds, yeast, and spore forming bacteria. In eggs, the shell contains mostly Gram-positive bacteria and some Gram-negative bacteria are found in rotten eggs (Board and Tranter, 1995). Most common contaminants of the shell are *Micrococcus, Staphylococcus, Bacillus, Pseudomonas, Alcalgenes, Flavobacterium, Escherichia, Aerobacter, Acinetobacter* and *Cytophagia*. The common microorganisms in rotten eggs are *Pseudomonas, Alcalgenes, Escherichia, Serratia, Xanthomonas, Aeromonas, Citrobacter, Acinetobacter* and *Proteus*. Molds are of lesser importance, though under high humidity conditions they can grow on the shell and spread their hyphae into the inner surface of the membrane.

Of the pathogens in egg that bring about disease in man, *Salmonella* sp. are the most potent. This genus causes illness (salmonellosis) by invading the small intestines of the host and producing an enterotoxin that causes inflammation and diarrhea, which can, at times, be fatal. The most common *Salmonella* species in egg is *Salmonella enteritidis*. While these Gram-negative bacteria grow best at temperatures between 8-46° C., in a pH range of 3.8 to 9.5, and at water activities above 0.94 (Bell and Kyriakides 2002), they are capable of surviving in conditions of low water activity, and extreme pH and temperature conditions. They are destroyed at temperatures of 70° C. and above, so they are susceptible to ordinary cooking temperatures if applied sufficiently long (Guthrie, 1992).

Presently most of the commercially available pasteurized eggs are pasteurized using conventional heating methods by separating the yolk and egg white before processing. But breaking and repacking them aseptically involves huge additional costs. Therefore in-shell egg pasteurization has gained a great commercial importance in recent years.

Current techniques for in-shell pasteurization of egg involve heating the eggs in a water bath at 60° C. for 20-25 minutes, depending on the size of the eggs. The current technology uses batch hot water immersion or moistened hot air or both combined, which requires a long treatment time, in the order of hours, to complete. This process is neither very energy efficient given the poor thermal properties of the shell and shell membrane—though they are not really the focus of the pasteurization—nor is it cost effective (Mermelstein 2001). Furthermore, these treatments affect the functional properties of the egg components, which is an extremely important consideration in the food industry.

This leads to the overheating of the egg white proteins (i.e. the egg white gets heated up more than the yolk, which is against the recommendations) resulting in denaturation and coagulation (Hou et al. 1996). This greatly affects the functional properties of the egg constituents. Therefore, a process that can heat the shell eggs from inside would be the best alternative to solve this problem.

The Food Safety and Inspection Service (FSIS) of United States Department of Agriculture (USDA) recommends heating the egg white and the egg yolk to 57.5° C. and 61.1° C. respectively for 2.5 minutes to ensure egg safety against *Salmonella* and other food-borne pathogens (FSIS-USDA 2006).

Proteins are highly heat-sensitive components of the egg. The functional properties of whipability, foamability, foam stability, etc. which make the egg an inevitable ingredient of various food products is severely affected by high temperatures. Experimentally it has been shown that for pasteurization the egg yolk needs to be heated to a higher temperature than the albumen. This is possible by conventional heating only if the yolk and albumen are separated (i.e. only if the shell is broken), as the yolk is concentric within the albumen in a shell egg. The existing methods of shell egg pasteurization result in overheating of the albumen and partially cooked eggs along the shell membrane (Hank et al. 2001).

Heat treatment for pasteurization also adversely affects the functional properties of the egg like foaming, emulsification and gelling which can be altered by heat denaturation of proteins. Pasteurization specifications vary with temperature, time and pH. The heat destruction of different serotypes of salmonellae at 60° C. was reported to be greater in egg white (pH as high as 9.0) than in yolk (pH as low as 6.0) and whole egg (average pH 7.6).

Hence the heat required for yolk pasteurization is greater than that required for the white. According to the Food Safety and Inspection Service (FSIS) of the United States Department of Agriculture (USDA) regulations whole egg is to be pasteurized at a minimum temperature of 60° C. for 3.5 minutes, while egg white and egg yolk must be brought to 57.5° C. and 61.1° C., respectively, for at least 2.5 minutes to ensure egg safety against *Salmonella* and other food-borne pathogens (FSIS-USDA 2006; Zeilder, 2002).

Although there are several methods of preservation and sanitation of in-shell eggs such as washing, rapid chilling, UV-irradiation and ultrasonic treatment, they do not destroy *Salmonella* inside the eggs, which may pose a serious health hazard to humans.

Pasteurization techniques used for liquid eggs is reported to be unsuitable for in-shell eggs due to heat denaturation. Hou et al. (1996) developed a process of pasteurization of in-shell eggs using water bath and hot-air-oven heating systems. A combination of the two methods (water-bath heating at 57° C. for 25 min followed by hot-air heating at 55° C. for 60 min) produced 7 log reductions in *S. enteritidis* ATCC 13076 in shell eggs.

The existing methods of pasteurizing shell eggs using hot water and/or hot air results in overheating of the albumen and produces partially cooked eggs (Hank et al. 2001). The effect of a low-temperature, extended-time, in-shell pasteurization process on the protein quality of egg albumen was evaluated by Hank et al. 2001. Although there are several advanced methods used for microbial disinfestation, including rapid chilling and ultrasonic treatments to destroy *Salmonella*, they are not effective for in-shell eggs due to the delicate and fragile nature of the egg shell (Hou et al. 1996).

Microwave heating is a potential solution for in-shell egg pasteurization. The microwave power distribution inside in-shell eggs also seem to be well-suited for uniform pasteurization. Theoretical mathematical studies have shown that even though albumen exhibits better dielectric properties than yolk, the egg's curvature has a focusing effect which leads to a suitable power distribution (Datta et al. 2005). Hence the in-shell egg appears ideally suited for pasteurization in a microwave environment (Fleischman 2004; Rehkopf 2005; Dev et al. 2008).

Microwave pasteurization of eggs can make the process faster and continuous, such that the complete operation can be done in a few minutes. Though heating uniformity can be an issue in microwave heating, it can be overcome with the proper orientation of the egg and a specially-designed waveguide, which is an engineering issue (Fleischman 2004), as well as the precise design of the container (equipped with microwave egg susceptors) taking the eggs into the microwave chamber (Yakovlev 2001).

Patents on the use of microwave energy for the pasteurization if in-shell eggs have been filed for protection at the International Bureau of the World Intellectual Property Organization (WO 2005/102064, 2005; WO 2004/037012, 2004; WO 2003/024249, 2003). These documents describe various approaches/contraptions to integrate microwave heating to egg packing line. However, none of them address the issues of egg quality and heating uniformity.

Furthermore, the need exists for pasteurization methods for other food items on an industrial level using microwave energy that does not negatively affect the quality of the food item.

Recent work published by Dev et al. (2008) confirmed that 2450 MHz microwaves can be successfully used to raise the temperature of in-shell eggs to the required pasteurization temperature in few minutes. It took about 65 sec. to reach the pasteurization temperatures at a power density of 3 W g-1 and 320 sec. at 0.75 W g-1. Results also indicated that with adequate microwave power modulation the yolk reached a higher temperature of 61° C. while simultaneously maintaining the albumen at 57° C. These are the temperatures required for proper pasteurization of the egg constituents. Lakins et al. (2008) had reported that applying directional microwave technology resulted in a 2-log reduction of *S. enteriditis*.

The doctoral thesis of Satyanarayandev Rajalakshmi Sivaramakrishnan (the former full name of inventor Satyanarayan Dev), entitled Microwave Pasteurization of Shell Eggs, presented to the Department of Bioresource Engineering Faculty of Agricultural & Environmental Sciences at McGill University in Quebec, Canada in June of 2010 found that the FDTD and FEM simulations along with the optimization studies led to the conclusion that a waveguide applicator specifically designed for the microwave pasteurization of a specific food item would accomplish the task with minimal quality tradeoffs. The performance of such a waveguide applicator will also depend on various parameters viz, microwave frequency, power density, orientation of the eggs and the residence time of the egg in the cavity.

Placing a second egg in the regular multimode microwave cavity changes the field distribution significantly. Therefore, to make this process more suitable for easy industrial application, an easily scalable multimode cavity which can handle multiple eggs without significant changes in distribution of power from one egg to the other is required. Hence, based on the optimal parameters obtained by simulations, a non-linear slotted waveguide applicator for heating shell eggs had to be designed and evaluated.

On another note pathogenic Shiga-Toxin-producing *Escherichia coli* (STEC) may cause human illnesses such as haemorrhagic colitis and life-threatening haemolytic-uraemic syndrome. Although a wide range of serotypes have been implicated in human STEC infections, five major serotypes (O157:H7, O26:H11, O103:H2, O111:H8, and O145:H28) are responsible for the vast majority of sporadic cases and outbreaks in Europe and USA. It has been reported in literature that widely varying *E. coli* concentrations ranging from <67 to 71,000 per 100 g were found in shellfish. Regardless of the sample type, serovars O103 and O145 followed by O26 and O157 were the most frequently detected. The National Shellfish Sanitation Program is designed to ensure that shellfish harvested from certified waters do not contain these naturally occurring toxins. But, the increasing availability of raw oysters at gastropubs and eateries has led to a dramatic increase in the rates of shellfish food poisoning in recent years. Eating raw oysters puts people with weak immune systems at risk of food poisoning from pathogens like Norovirus and Hepatitis A as well as and bacteria like *Vibrio vulnificus*. There are existing technologies like the ionizing electron-beam pasteurization process. Due to the ionizing nature of the process, it alters the taste and texture of the oysters, thereby reducing consumer acceptability and market value of the product. Additionally, concerns regarding irradiation of food is prevalent among consumers, thereby further decreasing the consumer acceptability of the product.

An innovative thermal pasteurization method using non-ionizing microwave technology that uses a non-linear slotted waveguide can increase the safety and shelf life of raw shellfish including oysters.

Fruits and vegetables are no exception to food safety concerns, given the wide spread reacall of tomatoes, lettuce and spinach due to *Salmonella* and *E. coli*. A microwave heat treatment using uniquely designed non-linear slotted waveguide not only eliminates the risk of pathogens in fruits and vegetables, it has also shown a 23±3% increase in total phenolics and 21±4% increase in total anthocyanins (antioxidants) was found in blueberries treated for 100 pulses at 5 W/g.

While certain aspects of conventional technologies have been discussed to facilitate disclosure of the instant application, Applicants in no way disclaim these technical aspects, and it is contemplated that the instant application may encompass one or more of these conventional technical aspects.

The present disclosure may address one or more of the problems and deficiencies in the art discussed above. However, it is contemplated that this disclosure may prove useful in addressing other problems and deficiencies in many technical areas. Therefore, the present application should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Embodiments disclosed herein include structures of a microwave pasteurization device, as well as related non-linear waveguides. For example, in accordance with one embodiment, a food item pasteurization device, the device including a pasteurization area comprising a microwave cavity into which microwaves are radiated; a microwave generator (a magnetron or a solid state microwave generator) to provide microwave energy to the pasteurization area; a power control; a non-linear slotted waveguide; wherein the non-linear slotted waveguide comprises shaped waveguide applicators; and, wherein the microwave energy is distributed in the pasteurization area to pasteurize the food item.

In further embodiments, the food item pasteurization device, where the shaped waveguide applicators are non-uniform and radiate microwaves nonuniformly to the food item, resulting in the required temperature distribution in the food.

In further embodiments, the food item pasteurization device, where the waveguide slots are oval shaped, lens-shaped, or plum-shaped.

In further embodiments, the food item pasteurization device, further comprising a holding area, after the pasteurization area, in which the food item is held in a heated environment for a period of time.

In further embodiments, the food item pasteurization device, where the food items are in-shell eggs, live in-shell oysters, tomatoes, or blueberries, or any other food item which can be made safe for raw consumption through pasteurization.

In further embodiments, where the food item pasteurization device is large enough to accommodate a plurality of food items and the microwave generator control modifies the duration and intensity of the microwave radiation depending on the number of food items placed in the microwave cavity.

In further embodiments, the food item pasteurization device, where the device further includes a temperature monitor to provide real-time temperature readings from the food item in the pasteurization area.

In further embodiments, the food item pasteurization device, where the device further includes a cooling area operatively linked to the pasteurization area in which the food item is held and cooled for a period of time.

In an alternative embodiment, a pasteurization device, the device comprising: a pasteurization area comprising a microwave cavity or microwave cavity portion into which microwave energy is radiated; a microwave generator to provide microwave energy to a live oyster located in the pasteurization area; a microwave generator control mechanism; a non-linear slotted waveguide; wherein the non-linear slotted waveguide comprises shaped slots; and, wherein the live oyster is pasteurized.

In further embodiments, the pasteurization device, wherein the shaped slots are nonuniform to radiate microwaves nonuniformly and provide uniform heating to the live oyster.

In further embodiments, the pasteurization device, wherein the nonuniform slots are lens-shapped or fan shaped.

In further embodiments, the pasteurization device, further comprising a holding area, after the pasteurization area, in which the live oyster is held in a heated environment for a period of time.

In further embodiments, the pasteurization device, wherein the microwave cavity is large enough to accommodate a plurality of in-shell eggs.

In further embodiments, the pasteurization device, wherein the microwave generator control modifies the duration of the microwave radiation depending on the number of in-shell eggs placed in the microwave cavity.

In further embodiments, the pasteurization device, further comprising a temperature monitor to provide real-time temperature readings from the in-shell eggs.

In further embodiments, the pasteurization device, further comprising a cooling are, after the pasteurization area in which the in-shell egg is held in a cooled area for a period of time.

In another embodiment, a method of pasteurizing in-shell eggs, the method comprising: providing an in-shell egg pasteurization device, the device comprising: a pasteurization area comprising a microwave cavity or microwave cavity portion into which microwaves are radiated; a microwave generator to provide microwaves to an in-shell egg located on the pasteurization area; a microwave generator control; a non-linear slotted waveguide; wherein the non-linear slotted waveguide comprises shaped slots; and, wherein the in-shell egg is pasteurized.

In further embodiments, the method of pasteurizing, wherein the shaped slots are nonuniform to radiate microwaves nonuniformly and provide the required temperature distribution in the in-shell egg.

In further embodiments, the method of pasteurizing, wherein the non-linear slots are oval.

In further embodiments, the method of pasteurizing, further comprising providing a holding area, after the pasteurization area, in which the in-shell egg is held in a heated environment for a period of time.

In further embodiments, the method of pasteurizing, further comprising providing a cooling area, after the pasteurization area, in which the in-shell egg is held in a cooled environment for a period of time.

BRIEF DESCRIPTION OF THE DRAWINGS

While the specification concludes with claims particularly pointing out and distinctly claiming what are regarded as embodiments of the invention, the advantages of embodiments of the disclosure may be more readily ascertained from the description of certain examples of embodiments of the disclosure when read in conjunction with the accompanying drawings, in which:

DETAILED DESCRIPTION

Figure 1:
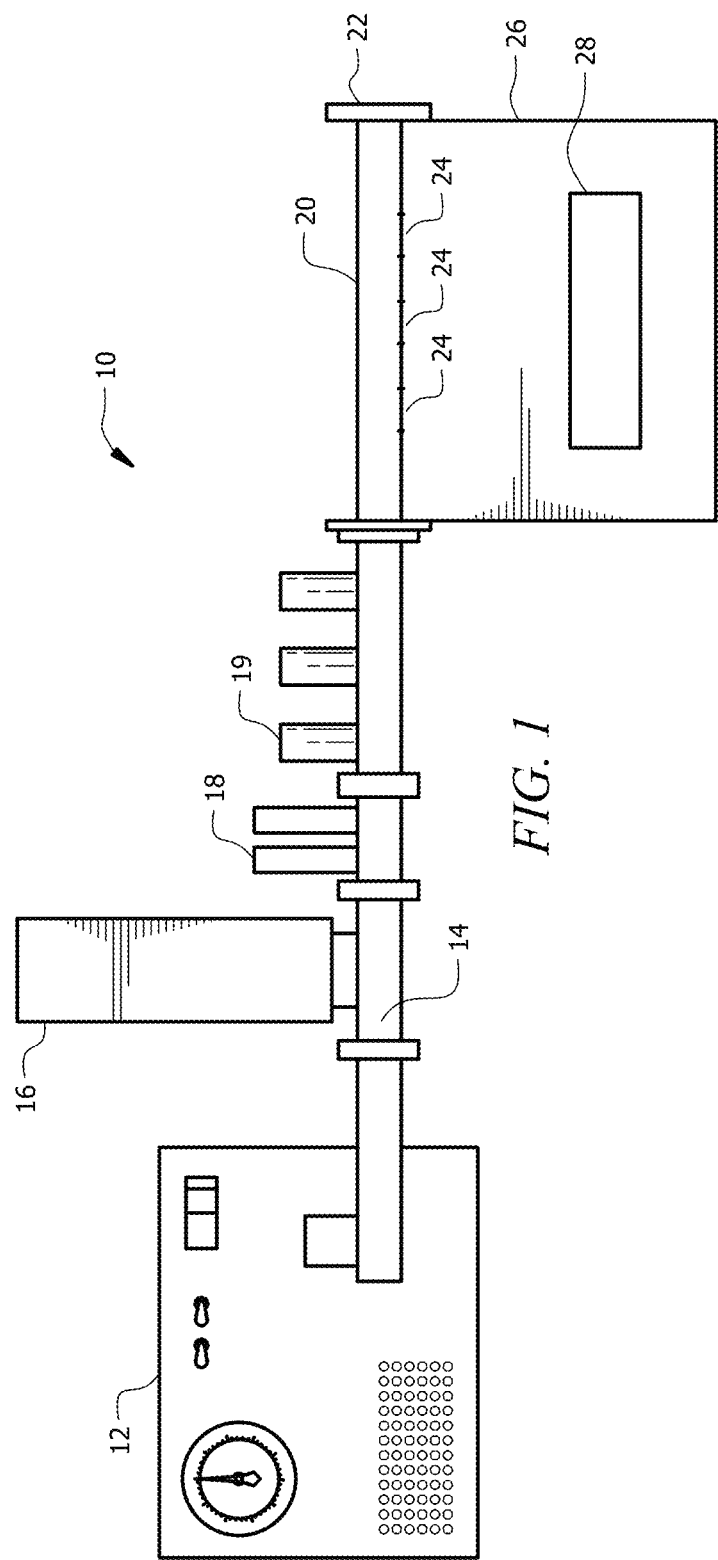
FIG. 1 depicts the schematic of the custom-built microwave pasteurization setup.

In the following detailed description, reference is made to the accompanying drawings, which form a part thereof, and within which are shown by way of illustration specific embodiments by which the invention may be practiced. It is to be understood that other embodiments may be used, and structural changes may be made without departing from the scope of the present application. These embodiments are described in sufficient detail to enable those of ordinary skill in the art to practice the claimed subject matter, and it is to be understood that structural, logical, and electrical changes may be made within the scope of this disclosure.

From the following descriptions, it should be understood that components of the embodiments as generally described and illustrated in the figures herein could be arranged and designed in a wide variety of different configurations. Thus, the following detailed description of various embodiments, as represented in the figures, is not intended to limit the scope of the disclosure but is merely representative of various embodiments. While various aspects of the embodiments are presented in drawings, the drawings are not necessarily drawn to scale unless specifically indicated.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. A person of ordinary skill in the art will understand that some process components are inherently disclosed herein and that adding various conventional process components and acts would be within the scope of this disclosure. In this description, specific implementations are shown and described only as examples and should not be construed as the only way to implement the claimed subject matter unless specified otherwise herein.

Illustrations presented herein are not meant to be actual views of any particular material, component, or system, but are merely idealized representations that are employed to describe embodiments of the disclosure. Referring in general to the following description and accompanying drawings, various embodiments of the present disclosure are illustrated to show its structure and method of operation. Common elements of the illustrated embodiments may be designated with similar or the same reference numerals. When a common element is designated with the same reference numeral it does not indicate that another conventional component may not be used. It should be understood that the figures presented are not meant to be illustrative of actual views of any particular portion of the actual structure or method but are merely idealized representations employed to more clearly and fully depict the claimed subject matter.

Referring in general to the following description and accompanying drawings, various embodiments of the present disclosure are illustrated to show its structure and method of operation. When common elements of the illustrated embodiments are designated with similar reference numerals the relevant descriptions of such features apply equally to the features and related components among all the drawings. Any suitable combination of the features, and variations of the same, described with components illustrated in FIG. 1, can be employed with the components of FIG. 2, and vice versa. This pattern of disclosure applies equally to further embodiments depicted in subsequent figures and described hereinafter.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Any headings used herein should not be considered to limit the scope of embodiments of the invention as defined by the claims below and their legal equivalents. Concepts described in any specific heading are generally applicable in other sections throughout the entire specification.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means ±15% of the numerical. In an embodiment, the term "about" can include traditional rounding according to significant figures of the numerical value. In addition, the phrase "about 'x' to 'y'" includes "about 'x' to about 'y'".

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

The phrases "connected to" and "coupled to" refer to any form of interaction between two or more entities, including mechanical, electrical, magnetic, electromagnetic, fluid, and thermal interaction. Two components may be connected or coupled to each other even though they are not in direct contact with each other. For example, two components may be coupled to each other through an intermediate component.

The directional terms "proximal" and "distal" are used herein at times to refer to opposite locations on a device. The proximal end of the device is defined as the end of the device closest to a user when the device is in use by the user. The distal end is the end opposite the proximal end, along the longitudinal direction of the device, or the end furthest from the user.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The principal elements for both multi-mode and focused microwave devices are the following four major components:
  (a) the microwave generator, usually called the "magnetron," which produces the microwave energy or alternatively a more advanced solid state microwave generator;
  (b) the waveguide, which is used to propagate the microwaves from the microwave generator to the microwave cavity;
  (c) the applicator, where the sample is placed; and,
  (d) the circulator, which allows microwaves to pass only in the forward direction.

The frequencies of 2450 MHz and 915 MHz are frequently employed in industrial uses. 2450 MHz is used for domestic microwave ovens and microwave-assisted extraction equipment.

Efficient power transmission is achieved with closed wave guides according to the principles of transmission lines. Wave guides are produced as metal pipes, mostly with a rectangular cross section.

The dimensions are dependent on the frequency. Wave guides can be both straight and curved. To keep the transmission losses to a minimum, metals that are good conductors such as copper or aluminum are used. The inside surface must be smooth and clean. There are two basic designs in microwave installations:

Monomode applicators: The product runs through a folded rectangular wave guide.

Multimode applicators: a resonating space in which the product to be heated is placed.

In the single mode or monomode, or in other words a focused microwave cavity, the vessel is placed in the waveguide where focused microwaves are applied to the food material. Usually, focused systems of the open-vessel type cannot be pressurized.

As the dimensions of the waveguide are always limited by the frequency of the waves used, for microwave frequencies, the capacity of focused microwave equipment is always limited and scaling up involves installing multiple units and heating in stages. Considering the large size it can reach, a multimode cavity type is used for the scaling-up of microwave equipment (Dai, 2006).

The issue of non-uniformity in microwave heating can be overcome with the proper orientation of the food item and a specially designed waveguide, which is an engineering issue (Fleischman 2004) and also by the precise design of the container (equipped with microwave susceptors) for the food item in the microwave chamber (Yakovlev 2001).

EXAMPLE 1

Design and Calibration of a Waveguide Applicator for Microwave Pasteurization of In-Shell Eggs Abstract The design of a slotted waveguide applicator for heating shell eggs is presented in which the applicator consists of an array of oval slots surrounded by a perfect electrically conducting reflector. The issue of non-uniformity in microwave heating was overcome by optimizing the power density used for the process and by rotating the egg during the heating process. Finite element method was applied to approximate the electric field within the biological medium and a closed form expression is presented for the electromagnetic coupling problem, which enables an optimization procedure to be performed. A power density of 1.5 W/g and an angular velocity of $\pi/6$ rad/s were found to be optimal. The results of the simulation were used to fabricate a waveguide applicator for 2450 MHz frequency with oval slots with a total power density adjusted to 1.5 W/g of load inside the cavity, rotated with a pair of rollers and a motor. The applicator enhanced both penetration and focusing, as well as provided the necessary temperature gradient from the egg yolk to the shell.

FIG. 1 depicts an embodiment of an instrumented and computer-controlled laboratory scale microwave (MW) oven device 10. In this embodiment, MW oven device 10 is composed of a 2450 MHz microwave generator 12 (Gold Star 2M214, South Korea) with adjustable power from 0 to 400 W, waveguides 20, a three-port circulator 14, a manual three-stub tuner 19 to match the load impedance, microwave couplers to measure forward and reflected power, a carbon load to absorb reflected power and a microwave cavity 26 made of brass, (47×47×27 cm) in which the food items were processed. The waveguides 20 were standard rectangular WR284 (72×35 mm) and a TE10 mode of application was used. The MW oven device also includes a MW absorber 16 and a power meter 18. The waveguides 20 and end plate 22 direct the microwaves into microwave cavity 26 where the food item is placed on food platform 28 (which can be replaced with a conveyor belt with roller for continuous operation in the industry) is subjected to the microwaves.

Figure 2:
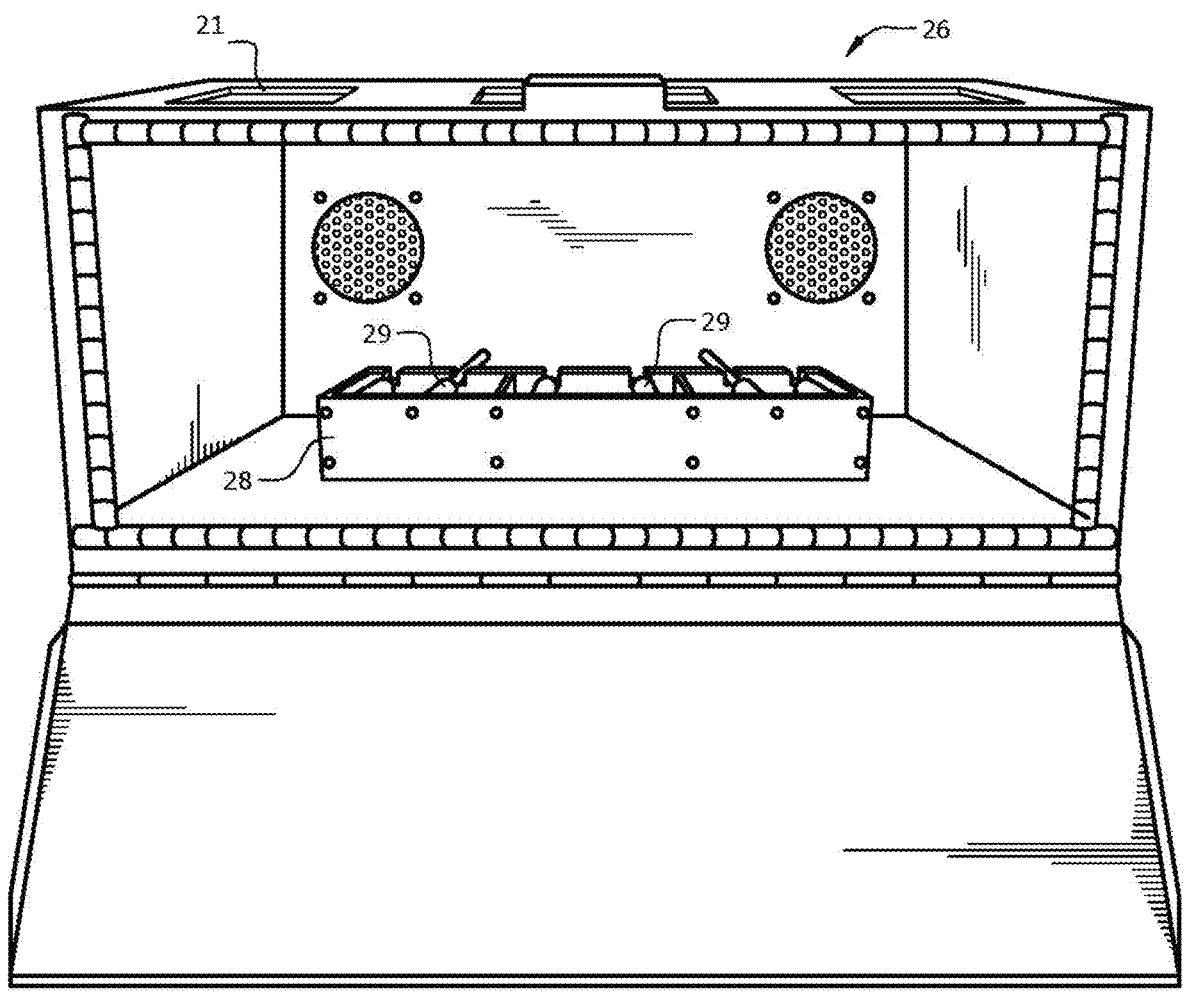
FIG. 2 depicts a detailed view of the custom-built microwave pasteurization setup showing a special microwave cavity.

The microwave generator 12 produced microwaves with varying power densities based on the power supplied. The microwaves generated were guided using the waveguides 20 into the microwave cavity 26 via the above-mentioned sequence of components. The manual three-stub tuner 19 was used to adjust the reflected power, thereby keeping it at the minimum possible value (<10% of the incident power). A close-up view of the microwave cavity 26 is depicted in FIG. 2. The top of the microwave cavity 26 has openings 21 which are depicted as rectangular openings but can be of any shape and size.

Figure 3:
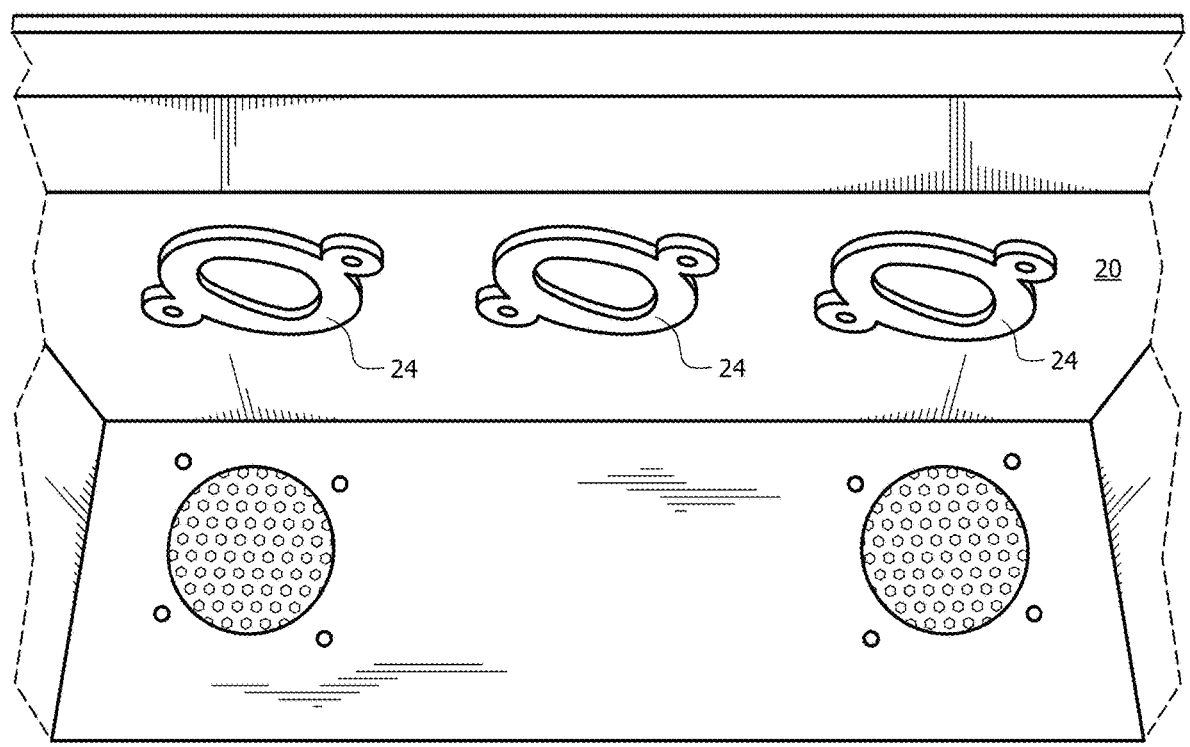
FIG. 3 depicts a detailed view of the custom-built microwave pasteurization setup showing the slotted waveguide with unique non-linear shaped slots.

The temperature of the food item, in this embodiment in-shell eggs, were measured using fiber optic probes (Nortech EMI-TS series, Quebec City, Canada) (not depicted). The probes were connected to a data acquisition unit (Agilent 34970A, Santa Clara, USA) (not depicted) which was itself connected to a computer. The entire setup was monitored and controlled using the HPVEE (Agilent, Santa Clara, USA) object-oriented programming language. The treatments were done in triplicates (each replicate obtained from an individual egg). A microwave power density of 1.5 W g-1 was used. The top of microwave cavity 26 is depicted in FIG. 3. The top of the microwave cavity 26 has oval slots 24 oriented down into the microwave cavity 26.

The eggs were heated in the microwave chamber until the yolk reached 62° C. As 62° C. was set as the microwave cut off temperature, several cycles of microwave heating occurred during the pasteurization holding time of 2.5 mins. The microwave generator was set to turn on when the temperature fell to 61° C. Eggs were rotated using cylindrical Teflon rollers 29 attached to food platform 28.

Calibration of the Microwave Pasteurization Setup

The calibration of the microwave pasteurization setup was done by heating 50 ml of water in microwave-transparent polypropylene tubes under each slot. As the microwaves progress through a slotted waveguide, the power radiated through consecutive slots decreases exponentially, as each slot radiates a certain percentage of the remaining power in the waveguide. This results in decreased power output in consecutive slots. Oval shaped waveguide slots 24 are affixed to the top of the microwave cavity 26. This resulted in significant distortion of the EM field by radiating 23±2% of the total power and provided a discontinuity in the E-field. This discontinuity of the sheet of electric current along one wall resulted in a shift in the position of the maximum E-field. The second slot of the oval waveguides 24 was radiating 46±2% of the available power in the waveguide and the third slot was radiating 87±2% of the available power in the waveguide 24 as the reflected power from the terminal end of the waveguide also added up to significant portion of the radiated by this slot. The distribution of the incident power was 25%, 35% and 35% respectively for the three slots of the oval waveguides 24 with approximately 5% reflected power.

Since the oval slot in waveguide 24 radiated lesser power compared to the other slots, a water load (50 ml of distilled water at 5° C. in a microwaveable polypropylene tube) instead of an egg was placed under this slot to absorb the power radiated. The eggs under the other slots then were exposed to a uniform power distribution and hence heated up uniformly. This was validated by experimental trials using fiber optic probes.

This setup can be replicated at the industrial scale, as a large microwave generator can be used and each slot can radiate a maximum of 215 W. Therefore, passing large amounts of power into the waveguide 24 automatically provides equal distribution of power across several slots of the waveguide 24 and the total number slots radiating uniform power will depend on the total power input.

The usual problem with microwave applicators (both domestic and industrial) is that the heating pattern is not uniform, and thus the final temperature distribution is not uniform. The reasons for this are as follows, and demonstrate the problems encountered in applicator design.

1. The electric field spatial distribution (i.e., the source of the heat) is inherently sinusoidal (i.e., non-uniform) and has peaks at specific locations which change positions as the dielectric constant of the material changes.
2. The strength of the electric field (and thus the heating) is reduced in the interior of a sample because the microwaves are absorbed on the way in.
3. The dielectric constant and the microwave absorption of the material change as the temperature increases, meaning that both the previously mentioned effects also change with the temperature increase.

For the above reasons, understanding and predicting the temperature distribution in microwave heated material depends upon knowing the temperature dependence of the complex dielectric constant i.e., the real and absorptive parts (Dev et al, 2008).

To reduce the electric field non-uniformity problem, it is common practice to move the sample around in the electric field to do some averaging. In batch processing, this averaging is done either by rotating the (solid) material (as in the household oven), or by stirring the (granular or liquid) material during the heating period. In continuous feed, continuous processing mode, the averaging is usually accomplished by moving the material into the oven, passing it through and out at a steady speed, so that each piece sees the same integrated amount of heating. e.g., a conveyor belt for solids or a microwave transparent tube for liquids and granular material (Meredith, 1998).

However, although faster and more uniform, microwave heating is not inherently uniform, and to make use of its high speed in industrial processing usually requires a custom shaped applicator which produces electric field distributions which take into account the material dielectric properties at the processing temperature (Metexas 1983). Therefore, a unique oval slotted waveguide 24 was designed for 2450 MHz frequency for the in-shell egg pasteurization with the help of finite element modelling and simulation.

Design of an Oval Slotted Waveguide

In light of the above discussions, as the eggs have a continuously varying diameter along their long axis in 2D and the electric field strength decreases radially or rather sinusoidally from the center point of its peak value. Thus, a slot design that radiates power with relatively uniform power density to the thickest portion along the central long axis of the egg as well as the thinnest edges of the eggs needs consideration. By continuously changing the width of the slot the amount of microwave coupling into the space can be varied continuously.

Figure 4:
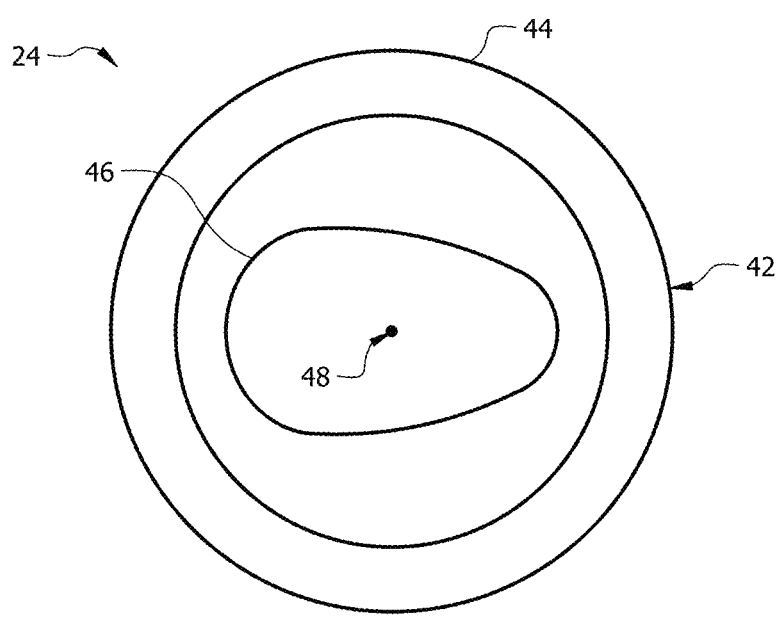
FIG. 4 depicts a schematic of a non-linear oval shaped waveguide applicator.
Figure 5:
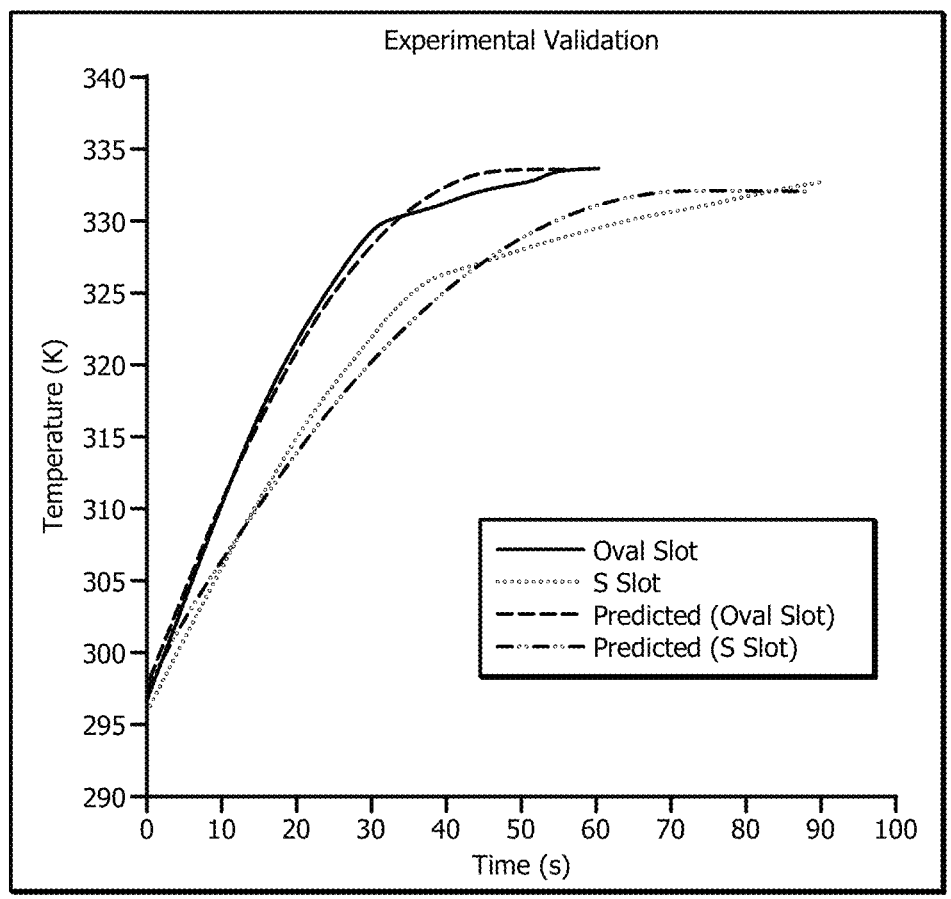
FIG. 5 depicts the experimental validation compared to predicted temperature readings for given time intervals showing the speed with which the temperature is reached by the microwave pasteurization setup inside a food item.

Therefore, by making an oval slot, variable output within the length of the slot is achieved. FIG. 4 depicts an embodiment of the oval waveguide 24 designed for the pasteurization of in-shell eggs. The oval waveguide 24 is composed of an aluminum plate 42 and an internal plate 44 into which the oval shape 46 is cut. Furthermore, the center point 48 of the oval shape 46 is used when determining the placement of the waveguide 20 in applicator chamber 26. Oval shape 46 is defined by two equations, the left of the center point 48 is defined by $$1 = \frac{x^2}{625} + \frac{y^2}{36}$$

and the right of the center point 48 is defined by $$1 = \frac{x^2}{961} + \frac{y^2}{36}.$$

Oval shape 46 is thus thicker left of center point 48 than right of the center point 48.

These results were validated using fiber optic probes inside the shell egg. The difference was found to be at least 0.5° K greater than the recommended pasteurization temperatures.

Conclusions

Thus, a slotted waveguide with a unique oval slot 46 was designed, fabricated and calibrated. A power density of 1.5 W/g and an angular velocity of $\pi/6$ rad/s were found to be optimal. The results of the simulation were used to fabricate a waveguide applicator for 2450 MHz frequency with oval slots 46 with a total power density adjusted to 1.5 W g-1 of load inside the microwave cavity 26, rotated with a pair of cylindrical Teflon rollers 29 and a motor inside food platform 28. The waveguides 20 enhance both penetration and focusing, as well as provide the necessary temperature gradient from the egg yolk to the shell. Industrial scale up of this microwave oven device 10 is contemplated in the present application. The results obtained can be readily used in building a scaled-up version for application in the industry.

To validate the effectiveness of a novel microwave egg pasteurization process, non-pathogenic *Escherichia coli* K12 was used as a surrogate for pathogenic *Salmonella enteritidis* in eggs. *E. coli* K12 (ATCC 23716) was cultured in *E. coli* broth for 2 days. Grade A shell eggs were inoculated with the $10^5$ CFU/ml cultured *E. coli* K12 and incubated below 5° C. for 5 days.

The study was conducted with a non-pathogenic strain of bacteria (*E. coli* K12). The inoculation and plating operations were conducted in an UV-sterilized laminar flow chamber (Fisher Scientific, USA) equipped with a Bunsen burner. A biological safety cabinet (Fisher Scientific, USA) was used for storing the plates. The eggs were then broken and plated in EC agar and incubated for 2 days at 37° C. The inoculated but thereafter untreated eggs had a count of $10^6$ CFU ml, whereas both types of microwave-pasteurized eggs had no detectable colonies. This indicated that microwave pasteurization is an effective way of pasteurizing in-shell eggs.

EXAMPLE 2

Microwave Pasteurization of Live Oysters

In order to evaluate the microwave pasteurization efficiency of live oysters (3"±0.2" in length), the *Vibrio vinificus* (ATCC 27562) was cultured, inoculated, incubated, and subjected to a microwave pasteurization treatment under the lens-shaped slots as described by the equation $y = \pm (0.125\sqrt{-64x^2 + 4225} - 5)$, and then were plated to assess the surviving population (CFU—Colony Forming Unit).

The Culture

*Vibrio vinificus* (ATCC 27562) were obtained in lyophilized form in vials from Cedarlane® Laboratories Limited, ON, Canada. This will be rehydrated using EC broth (Oxoid Canada) and will be cultured for 48 hours to obtain an initial population.

Food Samples

The fresh closed oysters were used in this study and kept in a refrigerator at 5° C. until used. The oysters remained closed. Any prematurely open oysters were not used, as this may be an indication that the oyster was otherwise infected or dead.

Inoculation and Incubation

Inoculation was done in triplicate for the two microwave treatments and for the untreated control. The oysters were inoculated by soaking them in a solution containing at least $10^6$ CFU/ml of the culture . . . four sets of inoculated oysters in triplicates (12 oysters in total) were incubated at ambient temperature (23±2° C.) for 2 days to allow the bacteria to grow and spread within the closed live oyster. A represntative samples (three oysters) was opened and plated to assess the initial bacterial load. It was found to be at least $10^7$ CFU/gm in the edible portion of the oysters.

Heat Treatments for Pasteurization Using Special Microwave Cavity with a Lens-Shaped Slotted Waveguide Three heat treatments for the microwave pasteurization of oysters were investigated using a Computer Controlled Laboratory Microwave Setup The first treatment consisted of heating oysters in a laboratory scale microwave oven working at 2450 MHz using a power density of 1 W/g. A custom built instrumented and computer-controlled laboratory-scale microwave (MW) oven as depicted in FIG. 1 was used for this part of the study, described above.

Figure 6A:
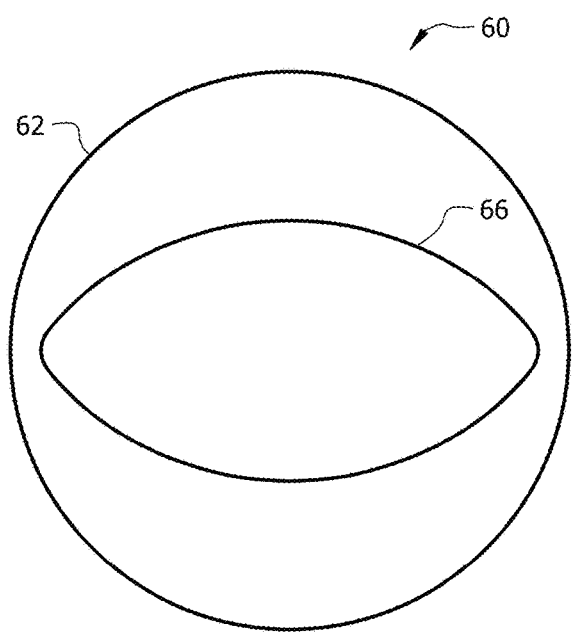
FIG. 6A depicts a schematic of a non-linear lens-shaped waveguide applicator.

The microwave generator produces microwaves with varying power densities based on the supplied power. The generated microwaves were guided using the waveguides 20 into the microwave cavity 26 via the above-mentioned components in a sequence. The slot design for waveguide applicator 60 that will be used in treatment of oysters is depicted in FIG. 6A. The lens-shaped waveguide applicator 66 is cut into aluminum plate 62.

The treatments were done in triplicates (each replicate obtained from an individual oyster). A microwave power density of 1 W/g was used. A tested and validated simulation approach developed by the inventor as published in Dev et al., 2012 was used for the prediction and temperature control during the pasteurization process.

The oysters were then heated in the microwave chamber, until the oyster reached 49° C. As 49° C. was set as the microwave cut off temperature, several cycles of microwave heating occurred during the pasteurization holding time of 3.5 min. The microwave generator was set to turn on when the temperature fell to 48.5° C. measured using an infrared thermal camera. The oysters were held upright using food platform 28.

Immediately after these treatments the oysters were immersed in a cold-water bath (5° C.) for 10 minutes, in order to ensure that the extent of heat damage to the proteins did not continue beyond the duration of the pasteurization.

As the power dissipation decreases exponentially from the first slot to the nth slot in a regular slotted waveguide 20, the dimensions of the first slot were adjusted to form a lens-shaped waveguide applicator 60, which provided distortion of the E field, making it possible to have a uniform power distribution among the slots.

Figure 6B:
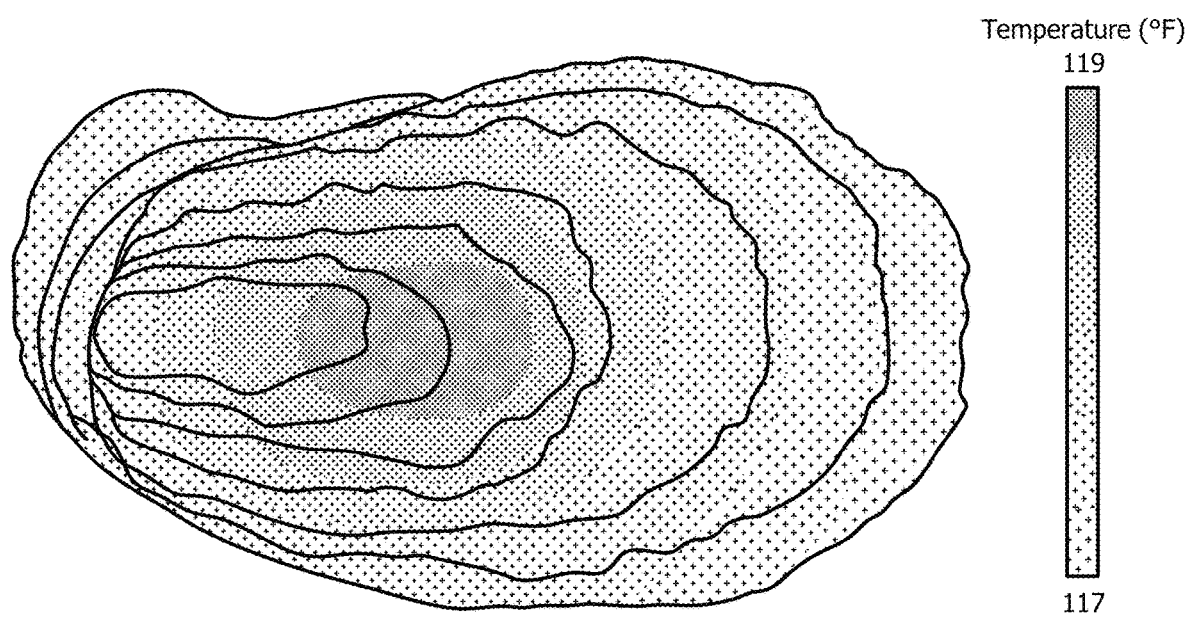
FIG. 6B depicts the temperature distribution in an oyster subjected to microwave pasteurization.

The heating of the oyster is depicted in FIG. 6B, which shows the temperature profile of oysters heated in the laboratory oven. These results indicate that MW heating under the lens shaped slots is relatively uniform.

Estimation of Microbial Population

Three un-inoculated oysters and three inoculated ones were opened immediately after inoculation and plated in duplicates on nutrient agar (prepared in the laboratory by adding Agar to the nutrient broth) to obtain the initial plate count.

The oyster was liquified and plated without any dilution as there was no *Vibrio* expected to be present initially. Dilutions of 5 and 6 logs made with sterile water were used in plating the inoculated oysters. Similarly, 100 μl of the diluted sample was used for plating thereby resulting in 106 and 106 dilutions respectively.

After two days' incubation, the inoculated oysters were opened and plated. The three untreated oysters were diluted to 5 and 6 logs and 100 μl were plated in duplicates before the microwave treatment. This resulted in the effective dilutions of $10^6$ and $10^7$ being plated respectively. Comparatively, 100 μl of the microwave-treated oyster samples were plated without dilution and with 2 log dilutions.

Results

The incubation for 2 days at 24±2° C. resulted in nearly two log increase in the bacterial population resulting in a little over $10^8$ CFU/ml, which is evident from the plate count after incubation.

There were less than 10 CFU ml$^{-1}$ of *Vibrio vinificus* left in the pasteurized oysters processed under the oval-shaped waveguide applicator 66 which corresponds to a 7-log reduction, far above the FSIS-USDA pasteurization requirements.

Discussion

All the microwave pasteurization methods accomplished the minimum target of five log reduction of pathogens which is the target for the pasteurization of eggs and oysters. Comparison among the three microwave heat treatments reveal that the lens-shaped waveguide applicator 66 microwave treatment was much more effective than the laboratory microwave treatment and the domestic microwave heating, as there was less than 10 CFU ml$^{-1}$ after pasteurization using the laboratory setup. This difference may be due to non-uniformity of heating in the domestic microwave oven and a few colonies must have survived due to the cold spot generated in the domestic microwave oven.

The difficulty in the monitoring and maintenance of the temperature throughout the pasteurization holding time leads to a lower efficacy of the domestic microwave treatment.

Maintaining the required temperature gradient throughout the pasteurization duration improves effective pasteurization of the oysters. The computer-controlled lens-shaped waveguide applicator 66 microwave setup performed well due to its unique design and also due to the ability to maintain the temperature throughout the pasteurization time.

Conclusion

The microwave heating of oysters was very efficient both in terms of time and energy, as the entire pasteurization process including the required holding time can be completed within 5 minutes. This helps retain the raw quality of the oysters, as protein denaturation is minimized. The microwave pasteurization technique for closed live oysters had proven to be very efficient. But it requires specifically-designed equipment for efficiently performance, as uniformity is always an issue while using microwaves.

EXAMPLE 3

Figure 7A:
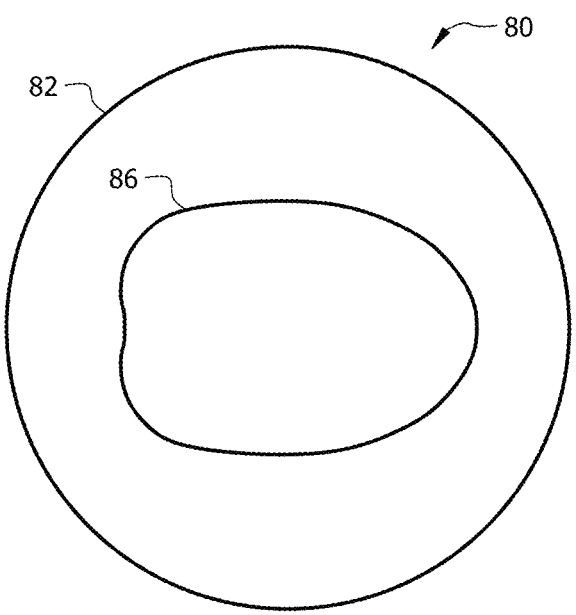
FIG. 7A depicts a schematic of a non-linear plum shaped waveguide applicator.

The same experimental set up was used in this example as was used in Example 2 discussed above to pasteurize fresh tomatoes. A microwave cavity specifically designed for the pasteurization of fresh tomatoes was used for this part of the study. This was similar to the computer-controlled laboratory domestic microwave setup, except for a specially designed waveguide applicator 80, depicted in FIG. 7A. The waveguide has uniquely-designed waveguide applicator 80 with a plum shaped opening 86 cut into aluminum plate 82.

As the power dissipation decreases exponentially from the first slot to the nth slot in a regular slotted waveguide 20, the dimensions of the first slot were adjusted to form a waveguide applicator 80 with a wider opening opening 86, which provided distortion of the E field, making it possible to have a uniform power distribution among the slots.

The power emitted by the plum shaped waveguide opening 86 was only half of the others, which would have led to unequal heating in the tomatoes. A power density of 5 W g$^{-1}$ was applied. The tomatoes were continuously rotated at a speed of 5 rpm during the treatment with the help of a pair of rollers 29 for each tomato in the food platform 28, controlled by a switch. The unit had a cooling fan attached to it, in order to vent any heat generated during the process. The uniformity of the temperature distribution in the berries due MW heating was highly dependent on the the power density used for the process and that 5 W/g power density provides appropriate temperature distribution to achieve required stress beneath the skin of the berries where the anti-oxidant concentration is the highest resulting in increases antipxidant production.

Figure 7B:
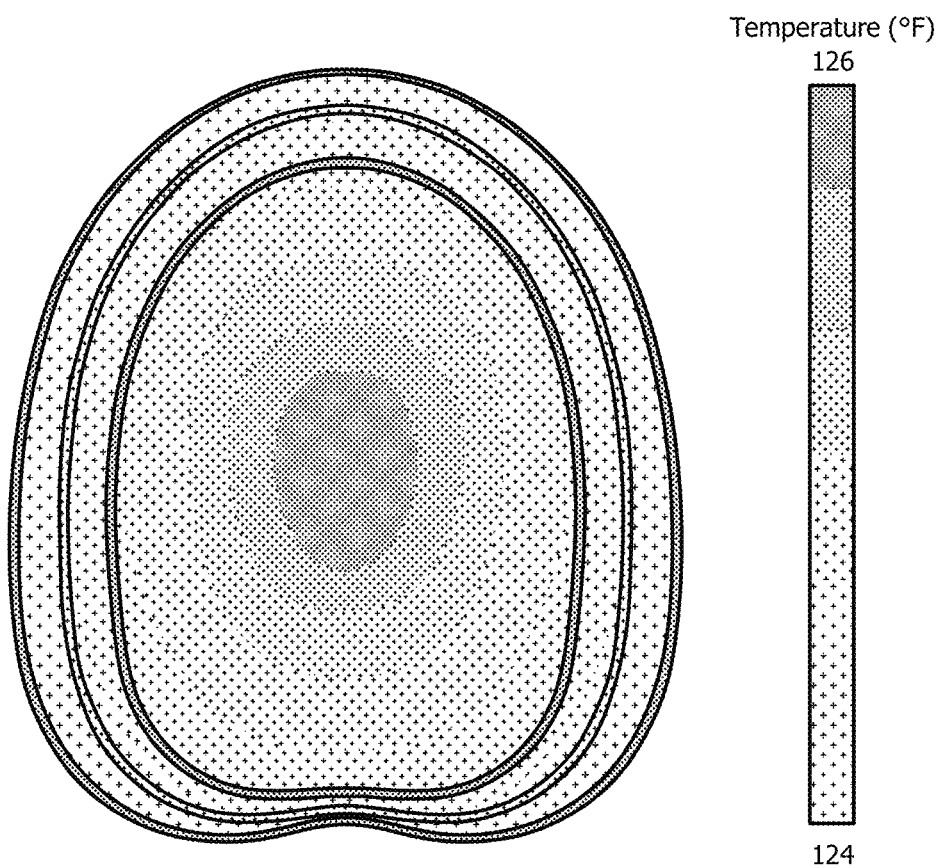
FIG. 7B depicts the temperature readings from inside a tomato subjected to microwave pasteurization.

The heating of the tomato is depicted in FIG. 7B, which shows the temperature profile of tomatoes heated in the laboratory scale pasteurizer. These results indicate that MW heating provides the necessary temperature distribution to achieve pasteurization while stimulating the production of lycopene. 125° F. is the required temperature for destruction of all the salmonella inside tomatoes. There was an 18±4% increase in lycopene content of the treated tomatoes

EXAMPLE 4

The same experimental set up was used in this example as was used in Example 2 discussed above to pasteurize fresh blueberries. A microwave cavity specifically designed for the pasteurization of fresh blueberries was used for this part of the study. This was similar to the computer-controlled laboratory domestic microwave setup, except for a specially designed waveguide applicator 80, depicted in FIG. 7A. The waveguide has uniquely-designed waveguide applicator 80 with a plum shaped opening 86 cut into aluminum plate 82 following the mathematical equation $$R(\theta) = \frac{1 + c_1 \sin(\theta) + c_2 \sin^3(\theta)}{\sqrt{\left[\frac{\cos(\theta)}{b}\right]^2 + \left[\frac{\sin(\theta)}{a}\right]^2}}$$

$R(\theta)$=Radial Distance from the origin in Polar coordinates
Shape Coefficients–$c_1$=0.24 and $c_2$=0.38
Semi-major axis–a=26 and Semi-minor axis–b=18

The power emitted by the plum shaped waveguide opening 86 was only half of the others, which would have led to unequal heating in the blueberries. A power density of 5 W $g^{-1}$ was applied. The blueberries were continuously rotated at a speed of 5 rpm during the treatment with the help of a pair of rollers 29 for each blueberry in the food platform 28, controlled by a switch. The unit had a cooling fan attached to it, in order to vent any heat generated during the process.

Figure 8:
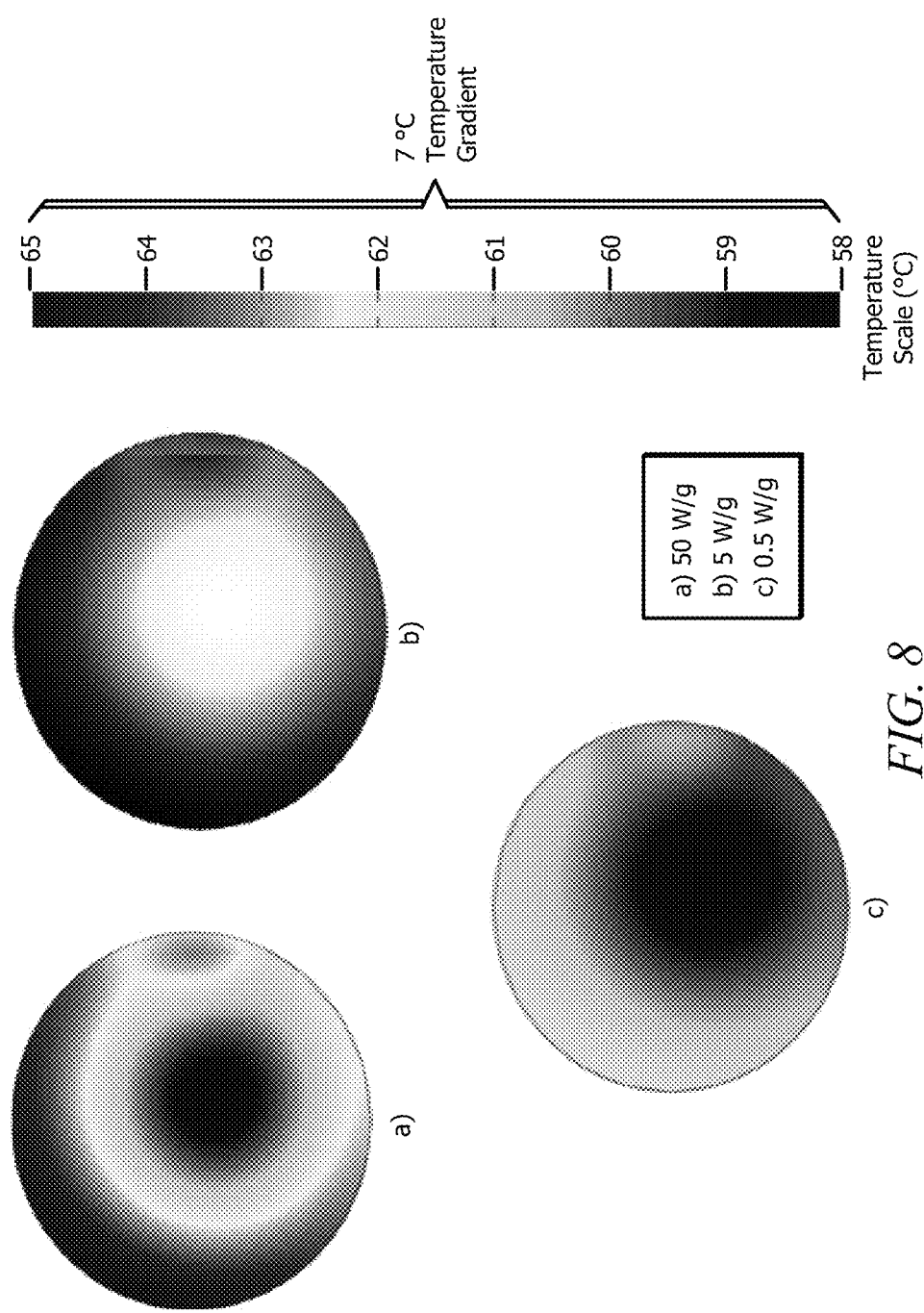
FIG. 8 depicts the temperature readings from inside blueberries subjected to microwave pasteurization.
Figure 9:
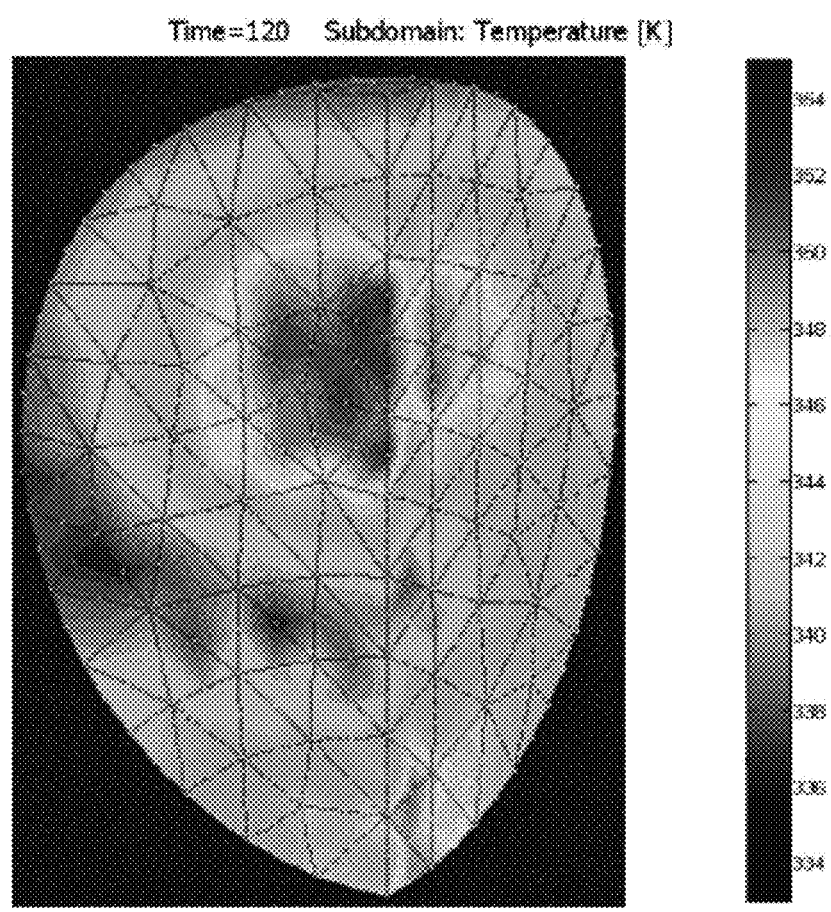
FIG. 9 depicts the temperature readings from eggs subjected to microwave pasteurization.

The heating of the blueberries is depicted in FIG. 8, which shows the temperature profile of blueberries heated in the laboratory oven. These results indicate that the uniformity of the temperature distribution in the berries due MW heating is highly dependent on the the power density used for the process and that 5 W/g power density provides appropriate temperature distribution to achieve required stress beneath the skin of the berries where the anti-oxidant concentration is the highest resulting in increases antipxidant production.

In other embodiments, a solid-state microwave generator may be utilized, which may generate high power levels (e.g. 75 kW).

REFERENCES

AAFC. 2005. Canada's Egg Industry at a glance: Agriculture and Agri-Food Canada.

Abdel-Nour, N., Ngadi, M., Prasher, S., & Karimi, Y. (2009a). Prediction of egg freshness and albumen quality using Visible/Near infrared spectroscopy. Food and Bioprocess Technology, 1-6.

Abdel-Nour, N., Ngadi, M., Prasher, S., & Karimi, Y. (2009b). Combined maximum R and partial least squares method for wavelengths selection and analysis of spectroscopic data. International Journal of Poultry Science, 8(2), 170-178.

Alajaji, S. A., and El-Ada , T. A. 2006 Nutritional composition of chickpea (Cicer arietinum L.) as affected by microwave cooking and other traditional cooking methods. Journal of Food Composition and Analysis, 19(8), 806-812.

American Egg Board: www.aeb.org Accessed 23 May 2010.

Amiali, M., Ngadi, M., Smith, J. P. & Raghavan, V. 2005. Inactivation of *Escherichia Coli* 0157:H7 and *Salmonella enteritidis* in liquid egg using continuous pulsed electric field system. Int. J. Food Engineering 1(8), Art. 8. Bamelis, F., K. Tona, J. G. De Baerdemaeker, and E. M. Decuypere. 2002. Detection of early embryonic development in chicken eggs using visible light transmission. British Poultry Science. 43: 922-928.

Bangalore, A. S., R. E. Shaffer, and G. W. Small. 1996. Genetic algorithm-based method for selecting wavelengths and model size for use with partial least-squares regression: application to near-infrared spectroscopy. Analytical Chemistry. 68: 4200-4212.

Barer R. and S. Tkaczyk, 1954. Refractive Index of Concentrated Protein Solutions. Nature. 173: 821-822.

Bell, C. and A. Kyriakides, 2002. Factors affecting growth and survival of *Salmonella*, Blackwell science, 84.

Berkowitz, D., Bennett, A. B., Secrist, J. L. and Milette, D. A., 1984. Method of producing thermally processed egg products. U.S. Pat. No: 4,425,367

Bircan, C., and S. A. Barringer. 2002(b). Use of dielectric properties to detect egg protein denaturation. Journal of Microwave and Electromagnetic Energy 37 (2): 89-96.

Bircan, C., S. A Barringer, 2002a. Determination of protein denaturation of muscle foods using dielectric properties. Journal of Food Science 67:202-205.

Birth, G. S., G. G. Dull, W. T. Renfore, and S. J. Kays. 1985. Non-destructive spectrometric determination of dry matter in onions. Journal of the American Society for Horticultural Science. 110(2): 297-303

Board, R. G. and H. S. Tranter, 1995. The microbiology of eggs In: Egg science and technology, Edt. By Stadelman, W. J. and O. J. Cotterill, Food Products Press, 81-97

Bohr, H., Bohr, J, 2000. Microwave enhanced kinetics observed in ORD studies of a protein. Bioelectromagnetics, 21 (1) 68-72.

Bruce, J., & Drysdal, E. M. (1994). Trans-shell transmission. In R. G. Board & R. Fuller (Eds.), Microbiology of the avian egg (pp. 63-92). London: Chapman & Hall.

Cabeza, M. C., Ordóñez, J. A., Cambero, I., Hoz, L. d. l. & Garcia, M. L. 2004. Effect of Thermoultrasonication on *Salmonella enterica* Serovar Enteritidis in Distilled Water and Intact Shell Eggs. J. Food Protection 67(9): 1886-1891.

Callebaut, L. J., 2007. 'Dielectric heating' in Power Quality & Utilisation Guide, European copper institute.

Casasent, D., and X. W. Chen. 2003. Waveband selection for hyperspectral data; optimal feature selection. The International Society for Optical Engineering. Optical Pattern Recognition XIV. Proceedings of the SPIE. 5106: 259-270.

CEMA. 2002. Supply Management of Eggs: Canadian Egg Marketing Agency.

CEMA. 2004. The Canadian Egg Industry Fact Sheet: Canadian Egg Marketing Agency.

CDC, (2001). Outbreaks of multidrug-resistant Salmonella typhimurium associated with veterinary facilities—Idaho, Minnesota, and Washington, 1999. MMWR Morb Mortal Weekly Rep 50:701-4.

Chaplin, M. 2008. Protein Folding and Denaturation in water, structure and science. http://www.lsbu.ac.uk/water/protein2.html. Accessed on 21 Nov. 2008.

Cheriyadat, A., and L. M. Bruce. 2003. Why principal component analysis is not an appropriate feature extraction method for hyperspectral data. IEEE, 3420-3422.

Coimbra, J. S. R, A. L. Gabas, L. A. Minim, E. E. Garcia Rojas, V. R. N. Telis, J. Telis-Romero, 2006. Density, heat capacity and thermal conductivity of liquid egg products, Journal of Food Engineering, 74(2) 186-190.

Cunnningham, F. E. 1995. Egg-Product Pasteurization. In Egg Science and Technology, edited by W. J. Stadelman and O. J. Cotterill. New York: Food Products Press.

Dai, J. 2006. Microwave-assisted extraction and synthesis studies and the scale-up study with the aid of FDTD simulation. PhD Thesis. McGill University, Montreal (QC) Canada.

Das, K., and M. D. Evans. 1992a. Detecting fertility of hatching eggs using machine vision II: Histogram characterization method. Transactions of the ASAE. 35(4):1135-1341.

Das, K., and M. D. Evans. 1992b. Detecting fertility of hatching eggs using machine vision II: Neural network classifiers. Transactions of the ASAE. 35(6):2035-2041.

Datta, Ashim, G. Sumnu, and G. S. V. Raghavan. 2005. Dielectric Properties of Foods. In Engineering Properties of Foods, edited by M. A. Rao and A. Datta. Boca Raton, Fla.: Taylor & Francis Publications.

De Ketelaere, B., F. Bamelis, E. Decuypere, and J. G. De Baerdemaeker. 2004. Non-destructive measurements of the egg quality. World's Poultry Science Journal. 60: 289-302.

Decareau, R. V. 1985. Microwaves in the food processing industry. Academic Press, New York.

Delisle, G. Y.; Wu, K. L. and Litva, J. (1991) Coupled finite element and boundary element method in electromagnetics. Computer Physics Communications. 68, 255-278.

Dev, S. R. S., V. Orsat, Y. Gariépy and G. S. V. Raghavan. 2008a. Optimization of Microwave Heating of In-Shell Eggs through Modeling and Experimental Trials. ASABE Annual International Meeting, Providence, USA Jun. 29-Jul. 2, 2008.

Dev, S. R. S., G. S. V. Raghavan and Y. Gariepy. 2008b. Dielectric properties of egg components and microwave heating for in-shell pasteurization of eggs. Journal of Food Engineering, 86(2), 207-214.

Dev, S. R. S., V. Orsat, Y. Gariépy and G. S. V. Raghavan. 2008c. Optimization of Microwave Heating of In-Shell Eggs through Modeling and Experimental Trials. ASABE Annual International Meeting, Providence, USA Jun. 29-Jul. 2, 2008.

Dev, S. R. S., V. Orsat, Y. Gariépy and G. S. V. Raghavan. 2009. Microbial Validation of Microwave pasteurization of eggs. ASABE Annual International Meeting, Reno, USA Jun. 21-Jun. 24, 2009

Dev, S. R. S., V. Orsat, Y. Gariépy and G. S. V. Raghavan. 2012. Finite element modeling for optimization of microwave heating of in-shell eggs and experimental validation. Int. J. Numer. Model.; 25:275-287

Du, Y. P., Y. Z. Liang, J. H. Jiang, R. J. Berry, and Y. Ozaki. 2004. Spectral regions selection to improve prediction ability of PLS models by changeable size moving window partial least squares and searching combination moving window partial least squares. Analytica Chimica Acta. 501: 183-191.

Durney, C. H. (1992): 'Antennas and other electromagnetic applicators in biology and medicine', Proc. IEEE, 80, 194-199.

Eblen, D. R., Annous, B. A., & Sapers, G. M. (2005). Studies to select appropriate non-pathogenic surrogate Escherichia coli strains for potential use in place of Escherichia coli O157:H7 and Salmonella in pilot plant studies. Journal of Food Protection, 68(2), 282-291.

EFC. 2008. Egg Farmers of Canada (formerly CEMA) at http://data.canadaegg.ca/ accessed on 3 Nov. 2008.

ENC, 2004. Egg Nutrition Center, Washington, DC. http://www.enc-online.org/factsheet/EggProtein.pdf. Accessed on 21 Nov. 2008.

Evenepoel, P., Geypens, B., Luypaerts, A., Hiele, M., Y. Ghoos and P. Rutgeerts 1998, Digestibility of Cooked and Raw Egg Protein in Humans as Assessed by Stable Isotope Techniques, 128(10), 1716-1722.

Fleischman, G. J. 2004. Microwave pasteurization of shell eggs. In IFT Annual Meeting. Las Vegas, USA: IFT.

Fleischman, G. J., C. L. Napier, D. Stewart, and S. A. Palumbo. 2003. Effect of Temperature on the Growth Response of *Salmonella enteridis* Inoculated onto the Vitelline Membrane of Fresh Eggs. Journal of Food Protection 66 (8):1368-1373.

FSIS-USDA. 2006. Risk Assessments for *Salmonella enteritidis* in Shell Eggs and *Salmonella* spp. in Egg Products. Omaha, Nebr.: FSIS.

FSIS-USDA. Risk Assessments for *Salmonella enteritidis* in Shell Eggs and *Salmonella* spp. in Egg Products. Omaha, Nebr.: FSIS. 2006.

Fu, W. and Metaxas, A. Numerical prediction of three-dimensional power density distribution in a multimode cavity. J. Microwave Power and Electromagnetic Energy. 29(2), 67-75. 1994.

Gardiol. F. E., Introduction to Microwaves, Artech House, Dedham, Mass., 1984.

Gielen, R. M. A. M., L. P. De Jong, and H. M. M. Kerjvkiet. 1979. Electro-optical blood-spot detection in intact eggs. IEEE Transactions on instrumentation and measurements. IM-28(3): 177-183.

Gómez, A. H., Y. He, and A. G. Pereira. 2006. Non-destructive measurement of acidity, soluble solids and firmness of Satsuma mandarin using VIS/NIR-Spectroscopy techniques. Journal of Food Engineering. 77:313-319.

Griffiths, M. W. 2005. Issues Related to the Safety of Eggs and Egg Products. Chile: University of Chile.

Guthrie, R. K, 1992. *Salmonella*, CRC Press, N.Y., p83

Haines, R. B 1939Microbiology in the preservation of the Hen's egg, Food investigation Spl. Report no. 47

Halbritter, J., 1992. On extrinsic effects in the surface impedance of cuprate superconductors by weak links. Journal of Appl. Physics. 71 (I), pp. 339-343, Hank, C. R., M. E. Kunkel, P. L. Dawson, J. C. Acton and F. B. Jr. Wardlaw. 2001. The Effect of Shell Egg Pasteurization on the Protein Quality of Albumen. Poultry Science 80:821-824.

Harlfinger, L. 1992. Microwave sterilization. Food Technol. 46(12):57-61

Harman, T., 2000. Advanced Engineering mathematics with MATLAB. Thomson Learning; 2 edition, ISBN-10: 0534371647, 784 pages.

Hou, H., R. K. Singh, P. M. Muriana, and W. J. Stadelman. Pasteurization of intact shell eggs. Food Microbiology, 1996; 13:93-101.

HP. Dielectric Probe Kit 85070A. In Test and Measure Measurements, edited by R. D. Unit. Palo Alto, Calif.: Hewlett Packard Corporation, 1992.

Institute of Medicine. Dietary Reference Intakes for Energy, Carbohydrate, Fiber, Fat. Fatty Acids, Cholesterol, Protein and Amino Acids. Food and Nutrition Board. Washington, DC: National Academy Press; 2002.

Kemps, B J, F. R. Bamelis, B. De Ketelaere, K. Mertens, K. Tona, E. M. Decuypere, and J. G. De Baerdemaeker.

2006. Visible transmission spectroscopy for assessment of egg quality. Journal of the Science of Food and Agriculture. 86:1399-1406.

Kemps, B. J., B. De Katelaere, F. R. Bamelis, K. Mertens, K. Tona, E. M. Decuypere, J. G. De Baerdemaeker, and F. Schwägelet. 2007. Albumen freshness assessment by combining visible Near-Infrared Transmission and Low-Resolution Proton Nuclear Magnetic Resonance Spectroscopy. Journal of Poultry Science. 86: 752-759.

Kilara, A and T Y Sharkasi, 1986 Effects of temperature on food proteins and its implications on functional properties, Critical Rev. Food Sci & Nutr., 23 (4) 323-397.

Knoerzer, K., Regier, M., & Schubert, H. 2005. Simulation of microwave heating processes. In: The microwave processing of foods. Ed. H. Schubert & M. Regier. CRC Press. NY. 317-333.

Lakins, D. G.; C. Z. Alvarado, L. D. Thompson, M. T. Brashears, J. C. Brooks, and M. M. Brashears, 2008. Reduction of Salmonella Enteritidis in Shell Eggs Using Directional Microwave Technology. Poultry Science. 87:985-991.

Laurena, C., V. V. Garcia, E. Mae and T. Mendoza, 1987, Effects of heat on the removal of polyphenols and in vitro protein digestibility of cowpea (Vigna unguiculata (L.) Walp.) Plant Foods for Human Nutrition Volume 37, Number 2/June, p 183-192

Letellier, M. and Budzinski, Microwave assisted extraction of organic compounds. Analusis. 27, 259-271. 1999.

Lewis, Michael J., and Neil J. Heppell, eds. 2000. Continuous Thermal Processing of Foods: asteurization and UHT Sterilization. Edited by M. J. Lewis and N. J. Heppell, Food Engineering Series. Malden, Mass., USA: Blackwell Publishing.

Li-Chan, E. C. Y., Powrie, W. D., & Nakai, S. The chemistry of eggs and egg products. In W. J. Stadelman & O. J. Cotterill (Eds.), Egg Science and Technology. New York: Food Products Press; 1995.

Liu, Y., Y. Ying, A. Ouyang, and Y. Li. 2007. Measurement of internal quality in chicken eggs using visible transmittance spectroscopy technology. Food Control. 18: 18-22.

Lokhande, M. P., Arbad, B. R., Landge, M. G., & Mehrotra, S. C. 1996. Dielectric properties of albumin and yolk of avian egg. Indian Journal of Biochemistry and Biophysics, 33, 156-158.

Lubec G, Wolf C, Bartosch B, 1989. Amino-acid isomerisation and microwave exposure. Lancet ii (8676): 1392-1393

Luque-Garcia, J. L. and M. D. Luque de Castro. Where is microwave-based analytical equipment for solid sample pre-treatment going? Trends in Analytical Chemistry, Vol. 22, No. 2, 2003

MATLAB documentation. 2008 Mathworks Inc, Boston, Mass.

Maton, Anthea; Jean Hopkins, Charles William McLaughlin, Susan Johnson, Maryanna Quon Warner, David LaHart, Jill D. Wright 1993. Human Biology and Health. Englewood Cliffs, N.J., USA: Prentice Hall. ISBN 0-13-981176-1. OCLC 32308337

McDonnell, L. R., R. E. Feeney, H. L. Hanson, A. Campbell, and T. F. Sugihara. The functional properties of the egg white proteins. Food Technology, 1955; 9:49-53.

McWilliams, M., 1989. Foods: Experimental Perspectives. MacMillan Publishing Company, New York, pp 161-162, 277-279.

Meda, V., Orsat, V., & Raghavan, G. S. V. 2005. Microwave heating and dielectric properties of foods. In H. Schudert & M. Regier (Eds.), The Microwave Processing of Foods. Cambridge: CRC press, Woodhead Publishing.

Meredith, R. J. (1998) Engineers' Handbook of Industrial Microwave Heating p. 363. The Institute of Electrical Engineers, Herts, U.K Mermelstein, N. H. 2001. Pasteurization of Shell Eggs. Food Technology, December 2001, 72,73 &79.

Metaxas, A. C. and Meredith, R. J. (1983) Industrial Microwave Heating p. 357. Peter Peregrinus Ltd., London Mingos, D. M. P and Baghurst, D. R. 1991. Application of microwave dielectric heating effects to synthetic problems in chemistry. Chemical society reviews, 20: 1

Morales, R. A., and R. M. McDowell. 1999. Economic consequences of Salmonella enterica serovar Enteritidis infection in humans and the U.S. egg industry. In Salmonella enterica serovar Enteritidis in humans and animals., edited by A. M. Saeed, R. K. Gast, M. E. Potter and P. G. Wall. Ames, Iowa, USA: Iowa State University Press.

Morrone, M 2008 Poisons on our plate, Praeger Publishers, p45

Mudgett, R. E., W. B. Westphal. 1989. Dielectric behavior of an aqueous cation exchanger. J Microwave Power 24:33-37.

Narushin, V. G., T. A. Van Kempen, M. J. Wineland, and V. L. Christensen. 2004. Comparing infrared spectroscopy and egg size measurements for predicting eggshell quality. Journal of Biosystems Engineering. 87:367-373.

NRC, 1976. National Research Council, Fat Content and Composition of Animal Products, Printing and Publishing Office, National Academy of Science, Washington, D.C., ISBN 0-309-02440-4; p. 203, online edition.

Ohlsson, T. 2000 Microwave heating, In: Innovations in Food Processing, Edt.by Barbosa-Canovas, G and G. W. Gould, CRC Press, p147

Okress, E. C., Microwave Power Engineering, Academic Press, N.Y., 1968.

Orsat, V., Raghavan, V., & Meda, V. 2005. Microwave technology for food processing: an overview. In the Microwave Processing of Foods. Ed. H. Schubert & M. Regier. CRC Press. NY. 106-118.

Ozmutlu, O., G Sumnu, S Sahin. Effects of different formulations on the quality of microwave-baked bread. Eur Food Res Technol 213:38-42, 2001.

Pace, W. E., W. B. Westphal, S. A. Goldblith, 1968. Dielectric properties of commercial cooking oils. J Food Sci 33:30-36.

Pao, S. and C. L. Davis. 2007. Comparing attachment, heat tolerance and alkali resistance of pathogenic and non-pathogenic bacterial cultures on orange surfaces. Journal of Rapid Methods & Automation in Microbiology. Vol: 9 No: 4 :271-278

Pething, R., 1979. Dielectric and Electronic Properties of Biological Materials. Wiley, N.Y.

Petres, J., Z. Márkus, É. Gelencsér, Z. Bogár, I.o Gajzágó, B. Czukor, 1990. Effect of dielectric heat treatment on protein nutritional values and some antinutritional factors in soya bean. Journal of the Science of Food and Agriculture, Volume 53 Issue 1, p 35-41

Pitsilis, J. G., H. V. Walton, and O. J. Cotterill. The apparent viscosity of egg white at various temperatures and pH levels. Transactions of ASABE, 1975; 18:347-349

Rahman, M. S., 2007. Handbook of Food Preservation. CRC Press. p714

Rehkopf, A., and Koutchma, T. N. 2005. Quality validation of a microwave-pasteurization process for shell-eggs. In IFT Annual Meeting, New Orleans, La.

Rodriguez, J J., Gutierrez-Lopez, G F and GVBarbosa-Canovas et al. 2003 An update on some key alternative processing technologies in Foodscience and biotechnology, Edt. by Gutierrez-Lopez and Barbosa-Canovas, CRC Press, p282

Schlegel, E. 1992. Commercial pasteurization and sterilization of food products using microwave technology. Food Technol. 46(12):62-63.

Schmilovitch Z., A. Hoffman, H. Egoza and E. Klein, 2002. Determination of egg freshness by NNIRS (near-near infrared spectroscopy), presented at EurAgEng, Budapest, paper No. 02-AP-023

Schroeder, Carl M., Alecia Larew Naugle, Wayne D. Schlosser, Allan T. Hogue, Frederick J. Angulo, Jonathon S. Rose, Eric D. Ebel, W. Terry Disney, Kristin G. Holt, and David P. Goldman. 2005. Estimate of Illnesses from *Salmonella Enteritidis* in Eggs, United States, 2000. Emerging Infectious Diseases 11 (1):113-115.

Schuman, J. D., B. W. Sheldon, J. M. Vandepopuliere, and H. R. Ball Jr. 1997. Immersion heat treatments for inactivation of *Salmonella enteritidis* with intact eggs. Journal of Applied Microbiology 83:438-444.

Shell eggs from farm to table, http://www.fsis.usda.gov/Factsheets/Focus_On_Shell_Eggs/index.asp. Accessed on 28 Nov. 2008.

Silver, S. "Microwave Antenna Theory and Design," Mass. Inst. N.Y., vol. 12, pp. 170-173; 1949.

Slater J. C., 1950. Microwave electronics. D. Van Nostrand Company Inc., New York Slaughter, D. C., and C. H. Crisosto. 1998. Non-destructive internal quality assessment of kiwifruit using Near-Infrared Spectroscopy. Seminars in Food Analysis. 3: 131-140.

Song W. O., Kerver, J. M. 2000. Nutritional contribution of eggs to American diets. J Am Coll Nutr. October;19 (5 Suppl): 556S-562S Srikaeo, K. and J A. Hourigan 2002 The use of statistical process control (SPC) to enhance the validation of critical control points (CCPs) in shell egg washing, Food Control, 13, 4-5, p 263-273.

St. Louis, M. E., D. L. Morse, and M. E. Potter. The Emergence of grade A eggs as a major source of *Salmonella enteritidis* infections: new implications for the control of salmonellosis. Journal of American Medical Association, 1988; 259:2103-2107.

Steven, C. R., Birkhold, S. G., & Gast, R. K. 2001. Eggs and egg products. In: Compendium of methods for microbiological examination of food. American Public Health Association, Washington DC, 473-481.

Stuerga, D. and Delmotte, M. 2002. Wave-material interactions, microwave technology and equipment. In Microwaves in Organic Synthesis, Ed. Loupy, A. Published by Wiley-VCH Verlag GmbH & Co. KGaA, Weinheim, 2002, 1-33.

Swami, S. 1982. Microwave heating characteristics of simulated high moisture foods. MS Thesis. USA: University of Massachusetts.

Tajchakavit, S. 1997. Microwave heating of fruit juices: kinetics of enzyme inactivation/microbial destruction and evaluation of enhanced thermal effects. M.Sc Thesis Dissertation, Bioresource Engg, McGill University, Ste Anne de Bellevue.

Todd, E. C. D. (2001). Epidemiology and globalization of foodborne disease. In R. G. Labbi & S. Garcia (Eds.), Guide to foodborne pathogens (pp. 1-22). New York: Wiley-Interscience.

Todeschini, R., D. Galvagni, J. L. Vilchez, M. Del Olmo, and N. Navas. 1999. Kohonen artificial neural networks as a tool for wacelength selection in multicomponent spectrofluorometric PLS modelling: application to phenol, o-cresol, m-cresol and p-cresol mixtures. Trends in Analytical Chemistry. 18:93-98.

Tulasidas, T. N. Combined convective and Microwave drying of grapes. PhD thesis dissertation. Dept. of Bioresource Engineering, McGill University, Canada. 1994.

Tulasidas, T. N.; Raghavan, G. S. V.; van de Voort, F.; Girard, R. 1995. Dielectric properties of grapes and sugar solutions at 2.45 GHz. Journal of Microwave Power & Electromagnetic Energy, 30 (2), 117-123.

Umbach, S. L., E. A. Davis, J. Gordon, P. T. Callaghan, 1992. Water self-diffusion coefficients and dielectric properties determined for starch-gluten-water mixtures heated by microwave and conventional methods. Cereal Chem 69:637-642.

USDA. 2004. Egg Fact Sheet. Omaha, Nebr.: USDA.

Valle-Riestra, J., and Barnes, R. H. 1970 Digestion of Heat-damaged Egg Albumen by the Rat, J. Nutr. 100 (8): 873-882

Van der Plancken I, A. V. Loey, and E. M. Hendrickx. Effect of heat-treatment on the physico-chemical properties of egg white proteins: A kinetic study. Journal of Food Engineering 2006; 75 (3):316-326.

Venkatesh, M. S., and G. S. V. Raghavan. 2005. An overview of dielectric properties measuring techniques. Canadian Biosystems Engineering 47 (7):15-30.

Ventura, M., A. De Jager, H. De putter, and F. P. M. M. Roelofs. 1998. Non-destructive determination of soluble solids in apple fruit by near infrared spectroscopy. Postharvest Biology and Technology. 14(1): 21-28.

Virtual Chembook, 2003. http://www.elmhurst.edu/~chm/vchembook/568denaturation.html. Accessed on 21 Nov. 2008.

Wei, R., and J. J. Bitgood. 1989. A new objective measurement of eggshell color. 1. A test for potential usefulness of two color measuring devices. Poultry Science. 69: 1175-1780.

Wilson, H. K. 1971. Large Protein Particle Changes in Ultra High-Temperature Sterilized Concentrated Skimmilk, Journal of Dairy Science Vol 54 (8) p1122.

Wong, P. Y., & Kitts, D. (2003). Physicochemical and functional properties of shell eggs following electron beam irradiation. Journal of the Science of Food and Agriculture, 83, 44-52.

WO 2003/024249. 2003. Egg handling pasteurization apparatus and method. World Intellectual Property Organization, International Bureau. Geneva Switzerland.

WO 2004/037012. 2004. Microwave egg pasteurization and apparatus. World Intellectual Property Organization, International Bureau. Geneva Switzerland.

WO 2005/102064. 2005. In-shell pasteurization of eggs. World Intellectual Property Organization, International Bureau. Geneva Switzerland.

Woodward, D. L., R. Khakhria, and W. M. Johnson. 1997. Human Salmonellosis Associated with Exotic Pets. Journal of Clinical Microbiology 35 (11):2786-2790.

Woodward, D. L., R. Khakhria, and W. M. Johnson. Human Salmonellosis Associated with Exotic Pets. Journal of Clinical Microbiology, 1997; 35 (11):2786-2790. Durney, C. H. (1992): 'Antennas and other electromagnetic applicators in biology and medicine', Proc. IEEE, 80, pp. 194-199

Yakovlev, V. V. 2001. Improving Quality of Microwave Heating by Packaging—Analytical Approach. In 2001 ASAE Annual International Meeting Sacramento, Calif., USA: ASAE.

Yin, Y., C. E. Walker, 1995. A quality comparison of breads baked by conventional versus non-conventional ovens: a review. Journal of Science of Food and Agriculture 67:283-291.

Zeilde, G, 2002 Further processing of eggs and egg products, In:Commercialchicken, meat and egg production, Edt by D. D. Bell and W. D. Weaver, Kluwer Academic Publishers, p1163).

Zhang and Datta, 2005. fig11.6, p 508, in Dielectric properties of food. (Datta, Sumnu, and Raghavan 2005)

Zhou, L.; Puri, V. M.; Anantheswaran, R. C. and Yeh, G. Finite element modeling of heat and mass transfer in food materials during microwave heating—model development and validation. J. Food Engineering. 25, 509-529. 1995.

The advantages set forth above, and those made apparent from the foregoing description, are efficiently attained. While the disclosure is susceptible to various modifications and implementation in alternative forms, specific embodiments have been shown by way of non-limiting example in the drawings and have been described in detail herein. Since certain changes may be made in the above construction without departing from the scope of the instant application, it is intended that all matters contained in the foregoing description or shown in the accompanying drawings shall be interpreted as illustrative and not in a limiting sense.

The disclosure is not intended to be limited to the particular forms disclosed. Rather, the disclosure is to cover all modifications, equivalents, and alternatives falling within the scope of the disclosure as defined by the following appended claims and their legal equivalents.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

It is also to be understood that the following claims are intended to cover all of the generic and specific features of the invention herein described, and all statements of the scope of the invention that, as a matter of language, might be said to fall therebetween.

What is claimed is:

1. A food pasteurization device for a target food item, the device comprising:
   a pasteurization area comprising a microwave cavity into which microwaves are radiated, the microwave cavity having a top and a bottom;
   a microwave generator to provide microwaves to the pasteurization area from the top of the microwave cavity to the bottom of the microwave cavity;
   a microwave generator control configured to modify one or more variables of the microwave radiation emitted from the microwave generator, wherein the one or more variables includes a total power density;
   a non-linear slotted waveguide positioned at any angle in the pasteurization area in the microwave cavity;
   wherein the non-linear slotted waveguide comprises a shaped waveguide applicator to optimally distribute radiation according to a geometry of the target food item, wherein the shaped waveguide applicator is selected from the group consisting of:
      an oval shape having a center point, wherein the first side of the center point is defined by the equation $$1 = \frac{x^2}{625} + \frac{y^2}{36}$$

and a second side of the center point is defined by the equation $$1 = \frac{x^2}{961} + \frac{y^2}{36},$$

a lanceolate shape, wherein the lanceolate shape includes a first vertex and a second vertex, such that the shaped waveguide applicator is tapered toward each of the first vertex and the second vertex, and
      a plum shape defined by the equation $$R(\theta) = \frac{1 + c_1 \sin(\theta) + c_2 \sin^2(\theta)}{\sqrt{\left[\frac{\cos(\theta)}{b}\right]^2 + \left[\frac{\sin(\theta)}{a}\right]^2}},$$

wherein $R(\theta)$ is the radial distance from the origin in polar coordinates, $c_1$ is 0.24, $c_2$ is 0.38, the semi-major axis $\alpha$ is 26, and semi-minor axis $\beta$ is 18; and
      wherein the microwaves emitted to the pasteurization area pasteurize the target food item.

2. The device of claim 1, wherein the shaped waveguide applicators are nonuniform to radiate microwaves nonuniformly to the food item.

3. The device of claim 1, further comprising a holding area, after the pasteurization area, in which the food item is held in a heated environment for a period of time.

4. The device of claim 1, wherein the food item is selected from the group consisting of in-shell eggs, live closed oysters, fresh tomatoes, and fresh blueberries.

5. The device of claim 1, wherein the microwave cavity is large enough to accommodate a plurality of food items.

6. The device of claim 5, wherein the microwave generator control modifies a duration of the microwave radiation depending on the number of food items placed in the microwave cavity.

7. The device of claim 1, further comprising a temperature monitor to provide real-time temperature readings from the food item in the pasteurization area.

8. The device of claim 1, further comprising a cooling area, after the pasteurization area in which the food item is held in a cooled area for a period of time.

9. A method of pasteurizing a target food item, the method comprising:
   providing a food item pasteurization device for the target food item, the device comprising:
      a pasteurization area comprising a microwave cavity into which microwaves are radiated, the microwave cavity having a top and a bottom;
      a microwave generator to provide microwave energy to the pasteurization area in a single mode or a multi mode-cavity;
      a microwave generator control configured to modify one or more variables of the microwave radiation emitted from the microwave generator, wherein the one or more variables includes a total power density;

a non-linear slotted waveguide positioned at any angle to the pasteurization area in the microwave cavity; wherein the non-linear slotted waveguide comprises a shaped waveguide applicators to optimally distribute radiation according to a geometry of the target food item;

placing a load of the target food item within the pasteurization area;

adjusting the total power density of the microwave radiation to 1.5 W/g of the load of the target food item within the pasteurization area;

rotating the target food item within the pasteurization area at an angular velocity of $\pi/6$ rad/s; and distributing the microwave radiation to the target food item within the pasteurization area, wherein microwaves emitted to the pasteurization area pasteurize the target food item.

10. The method of claim 9, wherein the shaped waveguide applicators are nonuniform to radiate microwaves nonuniformly to the food item.

11. The method of claim 9, wherein the shaped waveguide applicators is an oval shape having a center point, wherein a first side of the center point is defined by the equation $$1 = \frac{x^2}{625} + \frac{y^2}{36}$$

and a second side of the center point is defined by equation $$1 = \frac{x^2}{961} + \frac{y^2}{36}.$$

12. The method of claim 9, wherein the shaped waveguide applicators is a lanceolate shape, wherein each lanceolate shape includes a first vertex and a second vertex, such that the shaped waveguide applicators are tapered toward each of the first vertex and the second vertex.

13. The method of claim 9, wherein the shaped waveguide applicator is a plum shape defined by the equation $$R(\theta) = \frac{1 + c_1 \sin(\theta) + c_2 \sin^2(\theta)}{\sqrt{\left[\frac{\cos(\theta)}{b}\right]^2 + \left[\frac{\sin(\theta)}{a}\right]^2}},$$

wherein $R(\theta)$ is the radial distance from the origin in polar coordinates, $c_1$ 0.24, $c_2$ is 0.38, the semi-major axis $\alpha$ is 26, and semi-minor axis $\beta$ is 18.

14. The method of claim 9, wherein the food item is selected from he group consisting of in-shell eggs, live closed oysters, fresh tomatoes, and fresh blueberries.

15. The method of claim 9, further comprising a temperature monitor provide real-time temperature readings from the food item in the pasteurization area.

16. The method of claim 9, further comprising a cooling area, after the pasteurization area in which the food item is held in a cooled area for a period of time.

* * * * *